US012205744B2

(12) United States Patent
Okumura et al.

(10) Patent No.: US 12,205,744 B2
(45) Date of Patent: Jan. 21, 2025

(54) INDUCTOR

(71) Applicant: NITTO DENKO CORPORATION, Osaka (JP)

(72) Inventors: Keisuke Okumura, Osaka (JP); Yoshihiro Furukawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 603 days.

(21) Appl. No.: 17/437,671

(22) PCT Filed: Feb. 5, 2020

(86) PCT No.: PCT/JP2020/004225
§ 371 (c)(1),
(2) Date: Sep. 9, 2021

(87) PCT Pub. No.: WO2020/183990
PCT Pub. Date: Sep. 17, 2020

(65) Prior Publication Data

US 2022/0165472 A1 May 26, 2022

(30) Foreign Application Priority Data

Mar. 12, 2019 (JP) ................................ 2019-044773

(51) Int. Cl.
*H01F 27/255* (2006.01)
*H01F 17/04* (2006.01)
*H01F 27/28* (2006.01)

(52) U.S. Cl.
CPC ....... *H01F 27/255* (2013.01); *H01F 27/2823* (2013.01); *H01F 17/04* (2013.01); *H01F 2017/048* (2013.01); *Y10T 428/32* (2015.01)

(58) Field of Classification Search
None
See application file for complete search history.

(56) References Cited

U.S. PATENT DOCUMENTS

| | | | | |
|---|---|---|---|---|
| 6,392,525 | B1 | 5/2002 | Kato et al. | |
| 11,508,507 | B2 * | 11/2022 | Okumura | H01F 5/003 |

(Continued)

FOREIGN PATENT DOCUMENTS

| | | | |
|---|---|---|---|
| CN | 105225802 | A | 1/2016 |
| CN | 105575621 | A | 5/2016 |

(Continued)

OTHER PUBLICATIONS

JP-2018032841-A Abstract and Patent (Year: 2018).*

(Continued)

*Primary Examiner* — Kevin M Bernatz
(74) *Attorney, Agent, or Firm* — Edwards Neils LLC; Jean C. Edwards, Esq.

(57) ABSTRACT

An inductor includes a wire, and a magnetic layer covering the wire. The wire includes a conducting line, and an insulating layer covering the conducting line. The magnetic layer includes a magnetic particle and a binder. In a peripheral region of the wire, a filling rate of the magnetic particle is 40% by volume or more. The peripheral region is a region of the magnetic layer traveling outwardly from an outer peripheral surface of the wire by 1.5 times an average of the longest length and the shortest length from the center of gravity C of the wire to an outer surface of the wire in a cross-sectional view.

4 Claims, 20 Drawing Sheets

(56) References Cited

U.S. PATENT DOCUMENTS

| | | | | |
|---|---|---|---|---|
| 2004/0246084 | A1 | 12/2004 | Matsutani et al. | |
| 2006/0152321 | A1 | 7/2006 | Jung et al. | |
| 2007/0247268 | A1 | 10/2007 | Oya et al. | |
| 2008/0164844 | A1 | 7/2008 | Kato et al. | |
| 2009/0002117 | A1* | 1/2009 | Kawarai | H01F 17/0006 336/233 |
| 2009/0243780 | A1* | 10/2009 | Inoue | H01L 23/645 336/200 |
| 2013/0168149 | A1 | 7/2013 | Gundel | |
| 2013/0228717 | A1* | 9/2013 | Harada | H01F 1/01 252/62.55 |
| 2014/0167897 | A1* | 6/2014 | Choi | H01F 41/046 336/83 |
| 2015/0371752 | A1 | 12/2015 | Park et al. | |
| 2016/0086727 | A1 | 3/2016 | Choi et al. | |
| 2016/0126006 | A1* | 5/2016 | Ahn | H01F 27/306 29/606 |
| 2016/0172086 | A1 | 6/2016 | Habu et al. | |
| 2016/0247612 | A1 | 8/2016 | Ebe et al. | |
| 2016/0343498 | A1* | 11/2016 | Lee | H01G 4/005 |
| 2017/0004915 | A1* | 1/2017 | Park | H01F 27/255 |
| 2017/0148561 | A1 | 5/2017 | Yoon et al. | |
| 2018/0166194 | A1 | 6/2018 | Choi | |
| 2018/0268983 | A1* | 9/2018 | Kwon | H01F 27/292 |
| 2018/0286555 | A1* | 10/2018 | Aoki | H01F 27/2828 |
| 2018/0286569 | A1 | 10/2018 | Ahn et al. | |
| 2019/0013148 | A1 | 1/2019 | Ohkubo et al. | |
| 2019/0096566 | A1* | 3/2019 | Odahara | H01F 27/292 |
| 2019/0180909 | A1 | 6/2019 | Shinohara et al. | |
| 2019/0189340 | A1 | 6/2019 | Kim et al. | |
| 2019/0244743 | A1 | 8/2019 | Hirai et al. | |
| 2020/0075238 | A1 | 3/2020 | Okumura et al. | |
| 2020/0168375 | A1* | 5/2020 | Park | H01F 17/0013 |
| 2020/0258666 | A1* | 8/2020 | Kou | H01F 1/33 |
| 2022/0384091 | A1* | 12/2022 | Yoshioka | H01F 17/04 |

FOREIGN PATENT DOCUMENTS

| | | | | |
|---|---|---|---|---|
| CN | 105895307 | A | 8/2016 | |
| EP | 2 963 094 | A1 | 1/2016 | |
| JP | S48-088475 | U | 10/1973 | |
| JP | H05-152130 | A | 6/1993 | |
| JP | 10-074626 | A | 3/1998 | |
| JP | H10-144526 | A | 5/1998 | |
| JP | H11-040979 | A | 2/1999 | |
| JP | 2001-185421 | A | 7/2001 | |
| JP | 2003-282333 | A | 10/2003 | |
| JP | 2007-116347 | A | 5/2007 | |
| JP | 2008-098406 | A | 4/2008 | |
| JP | 2008-172873 | A | 7/2008 | |
| JP | 2009-009985 | A | 1/2009 | |
| JP | 2013-543635 | A | 12/2013 | |
| JP | 2014-165363 | A | 9/2014 | |
| JP | 2014-183193 | A | 9/2014 | |
| JP | 2015-092544 | A | 5/2015 | |
| JP | 2016-092422 | A | 5/2016 | |
| JP | 2017-005115 | A | 1/2017 | |
| JP | 2017-017314 | A | 1/2017 | |
| JP | 2017-037888 | A | 2/2017 | |
| JP | 2018032841 | A * | 3/2018 | H01F 17/0013 |
| JP | 2018-092092 | A | 6/2018 | |
| JP | 2018-098494 | A | 6/2018 | |
| JP | 2019-220618 | A | 12/2019 | |
| KR | 20160099882 | A | 8/2016 | |
| KR | 10-2017-0085889 | A | 7/2017 | |
| TW | 201513142 | A | 4/2015 | |
| TW | 201707019 | A | 2/2017 | |
| TW | 201826295 | A | 7/2018 | |
| WO | 2014/132701 | A1 | 9/2014 | |
| WO | 2016/199638 | A1 | 12/2016 | |
| WO | 2019/244620 | A1 | 12/2019 | |

OTHER PUBLICATIONS

International Preliminary Report on Patentability issued by WIPO on Aug. 25, 2021, in connection with International Patent Application No. PCT/JP2020/004223.
International Preliminary Report on Patentability issued by WIPO on Aug. 25, 2021, in connection with International Patent Application No. PCT/JP2020/004234.
International Preliminary Report on Patentability issued by WIPO on Aug. 25, 2021, in connection with International Patent Application No. PCT/JP2020/004236.
International Search Report Issued in PCT/JP2020/004232 on Apr. 21, 2020.
Written Opinion Issued in PCT/JP2020/004232 on Apr. 21, 2020.
International Search Report Issued in PCT/JP2020/004225 on Apr. 14, 2020.
Written Opinion Issued in PCT/JP2020/004225 on Apr. 14, 2020.
International Search Report Issued in PCT/JP2020/004238 on Apr. 28, 2020.
Written Opinion Issued in PCT/JP2020/004238 on Apr. 28, 2020.
International Search Report Issued in PCT/JP2020/004228 on Apr. 28, 2020.
Written Opinion Issued in PCT/JP2020/004228 on Apr. 28, 2020.
International Search Report Issued in PCT/JP2020/004233 on Apr. 28, 2020.
Written Opinion Issued in PCT/JP2020/004233 on Apr. 28, 2020.
Office Action, issued by the Japanese Patent Office on Jan. 31, 2023, in connection with Japanese Patent Application No. 2019-044778.
Office Action, issued by the Japanese Patent Office on Jan. 10, 2023, in connection with Japanese Patent Application No. 2019-044779.
Non-Final Office Action issued in U.S. Appl. No. 17/437,673 on Mar. 27, 2024.
Decision of Refusal, issued by the Japanese Patent Office on May 16, 2023, in connection with Japanese Patent Application No. 2019-044778.
Notification of Reasons to Refusal, issued by the Japanese Patent Office on Feb. 28, 2023, in connection with Japanese Patent Application No. 2019-044773.
Decision of Refusal, issued by the Japanese Patent Office on Mar. 7, 2023, in connection with Japanese Patent Application No. 2019-044771.
Notification of Reasons to Refusal, issued by the Japanese Patent Office on Mar. 7, 2023, in connection with Japanese Patent Application No. 2019-044768.
International Preliminary Report on Patentability issued by WIPO on Aug. 25, 2021, in connection with International Patent Application No. PCT/JP2020/004225.
International Preliminary Report on Patentability issued by WIPO on Aug. 25, 2021, in connection with International Patent Application No. PCT/JP2020/004232.
International Preliminary Report on Patentability issued by WIPO on Aug. 25, 2021, in connection with International Patent Application No. PCT/JP2020/004238.
International Preliminary Report on Patentability issued by WIPO on Aug. 25, 2021, in connection with International Patent Application No. PCT/JP2020/004228.
International Preliminary Report on Patentability issued by WIPO on Aug. 25, 2021, in connection with International Patent Application No. PCT/JP2020/004233.
Office Action, issued by the Japanese Patent Office on Dec. 20, 2022, in connection with Japanese Patent Application No. 2019-044768.
Office Action, issued by the Japanese Patent Office on Dec. 20, 2022, in connection with Japanese Patent Application No. 2019-044771.
Office Action, issued by the Taiwanese Patent Office on Mar. 21, 2024, in connection with Taiwanese Patent Application No. 109104915.
Office Action, issued by the Taiwanese Patent Office on Mar. 21, 2024, in connection with Taiwanese Patent Application No. 109104980.
Non-Final Office Action issued in U.S. Appl. No. 17/437,682 on May 13, 2024.
Non-Final Office Action issued in U.S. Appl. No. 17/437,663 on May 21, 2024.

(56) References Cited

OTHER PUBLICATIONS

Non-Final Office Action issued in U.S. Appl. No. 17/437,680 on May 29, 2024.

Office Action, issued by the Korean Intellectual Property Office on Jun. 11, 2024, in connection with Korean Patent Application No. 10-2021-7028618.

Office Action, issued by the Korean Intellectual Property Office on Jun. 7, 2024, in connection with Korean Patent Application No. 10-2021-7028621.

Office Action, issued by the Korean Intellectual Property Office on Jun. 7, 2024, in connection with Korean Patent Application No. 10-2021-7028625.

Office Action, issued by the Korean Intellectual Property Office on Jun. 7, 2024, in connection with Korean Patent Application No. 10-2021-7028626.

Office Action, issued by the Taiwanese Patent Office on Mar. 7, 2024, in connection with Taiwanese Patent Application No. 109104913.

Office Action, issued by the Taiwanese Patent Office on Mar. 7, 2024, in connection with Taiwanese Patent Application No. 109104912.

* cited by examiner

First direction
One side
Other side
Thickness direction
One side
Other side

First direction
One side
Other side
Thickness direction
One side
Other side

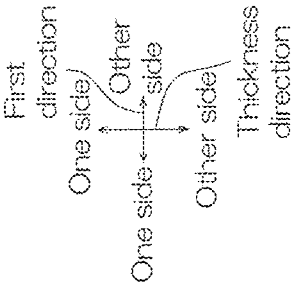
FIG. 12H
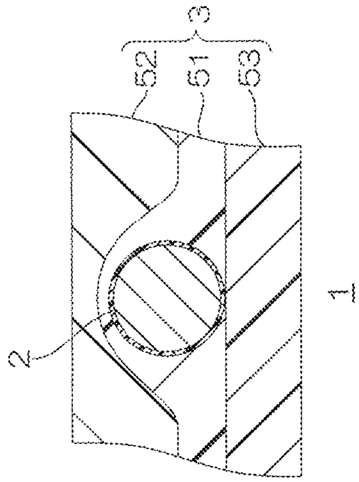
FIG. 12G
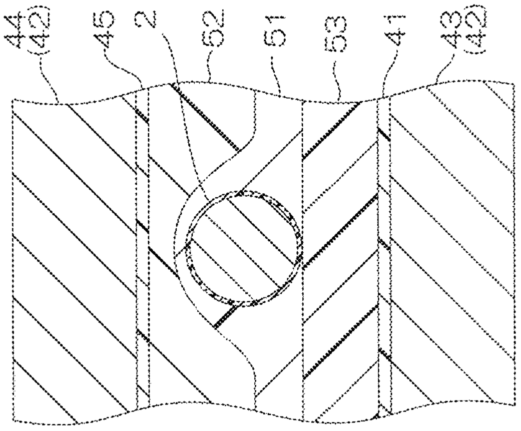

INDUCTOR

CROSS-REFERENCE TO RELATED APPLICATIONS

The present application is a 35 U.S.C. 371 National Stage Entry PCT/JP2020/004225, filed on Feb. 5, 2020, which claims priority from Japanese Patent Application No. 2019-044773, filed on Mar. 12, 2019, the contents of all of which are herein incorporated by reference in their entirety.

TECHNICAL FIELD

The present invention relates to an inductor.

BACKGROUND ART

Conventionally, it has been known that an inductor is loaded on an electronic device and the like to be used as a passive element for a voltage conversion member and the like.

For example, an inductor including a rectangular parallelepiped chip body portion made of a magnetic material, and an inner conductor such as copper embedded in the interior of the chip body portion, and having a cross-sectional shape of the chip body portion similar to that of the inner conductor has been proposed (ref: for example, Patent Document 1).

CITATION LIST

Patent Document

Patent Document 1: Japanese Unexamined Patent Publication No. H10-144526

SUMMARY OF THE INVENTION

Problem to be Solved by the Invention

Recently, there is a demand that the inductor has further higher inductance from the viewpoint of high performance, miniaturization, power saving of the electronic device. However, in the inductor described in Patent Document 1, there is a problem that the above-described demand cannot be satisfied.

On the other hand, in Patent Document 1, since a plurality of conductive layers made of conductive paste are laminated by printing, there is a problem that the inductor cannot be conveniently obtained for a large number of steps.

The present invention provides an inductor capable of being conveniently obtained with a simple configuration and having excellent inductance.

Means for Solving the Problem

The present invention (1) includes an inductor including a wire and a magnetic layer covering the wire, wherein the wire includes a conducting line and an insulating layer covering the conducting line; the magnetic layer contains a magnetic particle and a binder; in a peripheral region of the wire, a filling rate of the magnetic particle is 40% by volume or more; and the peripheral region is a region traveling outwardly from an outer surface of the wire by 1.5 times an average of the longest length and the shortest length from the center of gravity of the wire to the outer surface of the wire in a cross-sectional view.

In the inductor, since the filling rate of the magnetic particle is 40% by volume or more in the peripheral region, the inductance is excellent.

The present invention (2) includes the inductor described in (1), wherein the magnetic particle includes an anisotropic magnetic particle.

The present invention (3) includes the inductor described in (2), wherein the anisotropic magnetic particle is orientated in a portion adjacent to the wire in the magnetic layer.

In the inductor, since the anisotropic magnetic particle is orientated in a portion adjacent to the wire in the magnetic layer, the inductance is excellent.

The present invention (4) includes the inductor described in (2) or (3), wherein the peripheral region includes a first region in which the anisotropic magnetic particle is orientated along an outer peripheral direction of the wire and a second region in which the anisotropic magnetic particle is not orientated along the outer peripheral direction of the wire.

Since the peripheral region of the inductor includes the first region in which the anisotropic magnetic particle is orientated along the outer peripheral direction of the wire, the inductance is excellent.

Furthermore, since the peripheral region of the inductor includes the second region in which the anisotropic magnetic particle is not orientated along the outer peripheral direction of the wire, the DC superposition characteristics are excellent.

The present invention (5) includes the inductor described in (4), wherein the first region includes a third region and a fourth region disposed at spaced intervals to each other in the outer peripheral direction of the wire, and the total angle of an angle $\alpha\mathbf{1}$ of a central angle of the third region and an angle $\alpha\mathbf{2}$ of the central angle of the fourth region is an obtuse angle.

In the inductor, since the total angle ($\alpha\mathbf{1}+\alpha\mathbf{2}$) of the angle $\alpha\mathbf{1}$ of the central angle of the third region and the angle $\alpha\mathbf{2}$ of the central angle of the fourth region is the obtuse angle, the inductance is further more excellent by the anisotropic magnetic particle which is orientated in the outer peripheral direction in the third region and the fourth region.

The present invention (6) includes the inductor described in any one of (1) to (5), wherein the binder contains a cured product of a thermosetting component in a B-stage state.

In the inductor, since the binder contains the cured product of the thermosetting component in a B-stage state, a peripheral region having a high filling rate of the magnetic particle is easily and conveniently formed by the magnetic sheet containing the thermosetting component in a B-stage state, and also, the cured product of the thermosetting component is formed, so that the mechanical strength is excellent.

Effect of the Invention

The inductor of the present invention has excellent inductance.

BRIEF DESCRIPTION OF THE DRAWINGS

FIG. 1A illustrating a cross-sectional view in which a cross section is hatched and FIG. 1B illustrating a cross-sectional view showing the orientation of anisotropic magnetic particles in a magnetic layer.

FIG. 2A illustrating a first step of disposing a wire in a first release sheet, FIG. 2B illustrating a second step of covering the wire with a first magnetic sheet, and FIG. 2C illustrating a third step of removing the first release sheet.

FIG. 3D illustrating a step of disposing a second magnetic sheet and a third magnetic sheet, FIG. 3E illustrating a fourth step of covering one surface of the first magnetic sheet with the second magnetic sheet, and a fifth step of covering the other surface of the first magnetic sheet in a B-stage state with the third magnetic sheet, and FIG. 3F illustrating a step of taking out the inductor.

FIG. 4A illustrating a first step of disposing a wire in a first release sheet, FIG. 4B illustrating a second step of covering the wire with a first magnetic sheet, and FIG. 4C illustrating a step of disposing a second magnetic sheet.

FIG. 5D illustrating a fourth step of covering one surface of the first magnetic sheet with the second magnetic sheet, FIG. 5E illustrating a third step of removing the first release sheet, and FIG. 5F illustrating a step of disposing a third magnetic sheet.

FIG. 6G illustrating a fifth step of covering the other surface of the first magnetic sheet in a B-stage state with the third magnetic sheet, and FIG. 6H illustrating a step of taking out the inductor.

FIG. 7A illustrating a cross-sectional view in which a cross section is hatched and FIG. 7B illustrating a cross-sectional view showing the orientation of anisotropic magnetic particles in a magnetic layer.

FIG. 8A illustrating a first step of disposing a wire in a first release sheet, FIG. 8B illustrating a second step of covering the wire with a first magnetic sheet, and FIG. 8C illustrating a third step of removing the first release sheet.

FIG. 9D illustrating a step of disposing a second magnetic sheet and a third magnetic sheet, FIG. 9E illustrating a fourth step of covering one surface of a first magnetic sheet with the second magnetic sheet, and a fifth step of covering the other surface of the first magnetic sheet in a C-stage state with the third magnetic sheet, and FIG. 9F illustrating a step of taking out the inductor.

FIG. 10A illustrating a first step of disposing a wire in a first release sheet, FIG. 10B illustrating a second step of covering the wire with a first magnetic sheet, and FIG. 10C illustrating a step of disposing a second magnetic sheet.

FIG. 11D illustrating a fourth step of covering one surface of the first magnetic sheet with the second magnetic sheet, FIG. 11E illustrating a third step of removing the first release sheet, and FIG. 11F illustrating a step of disposing a third magnetic sheet.

FIGS. 12G to 12H, subsequent to FIG. 11F, show process views for illustrating the method for producing the modified example of the second embodiment:

FIG. 12G illustrating a fifth step of covering the other surface of the first magnetic sheet in a C-stage state with the third magnetic sheet, and FIG. 12H illustrating a step of taking out the inductor.

FIG. 13A illustrating a step of disposing a wire in a third magnetic sheet in a C-stage state, FIG. 13B illustrating a step of covering the wire and one surface of the third magnetic sheet with a first magnetic sheet, and FIG. 13C illustrating a step of disposing a second magnetic sheet.

FIG. 14D illustrating a step of covering the first magnetic sheet with the second magnetic sheet, and FIG. 14E illustrating a step of taking out the inductor.

FIG. 16A illustrating a modified example in which an intersection portion is present in a second region and FIG. 16B illustrating a modified example in which the intersection portion is not present in the second region.

FIG. 18A illustrating an SEM image after a second step and

FIG. 18B illustrating an SEM image of an inductor.

DESCRIPTION OF EMBODIMENTS

First Embodiment

1. Inductor

A first embodiment of an inductor of the present invention is described with reference to FIGS. 1A to 2B.

Figure 1A:
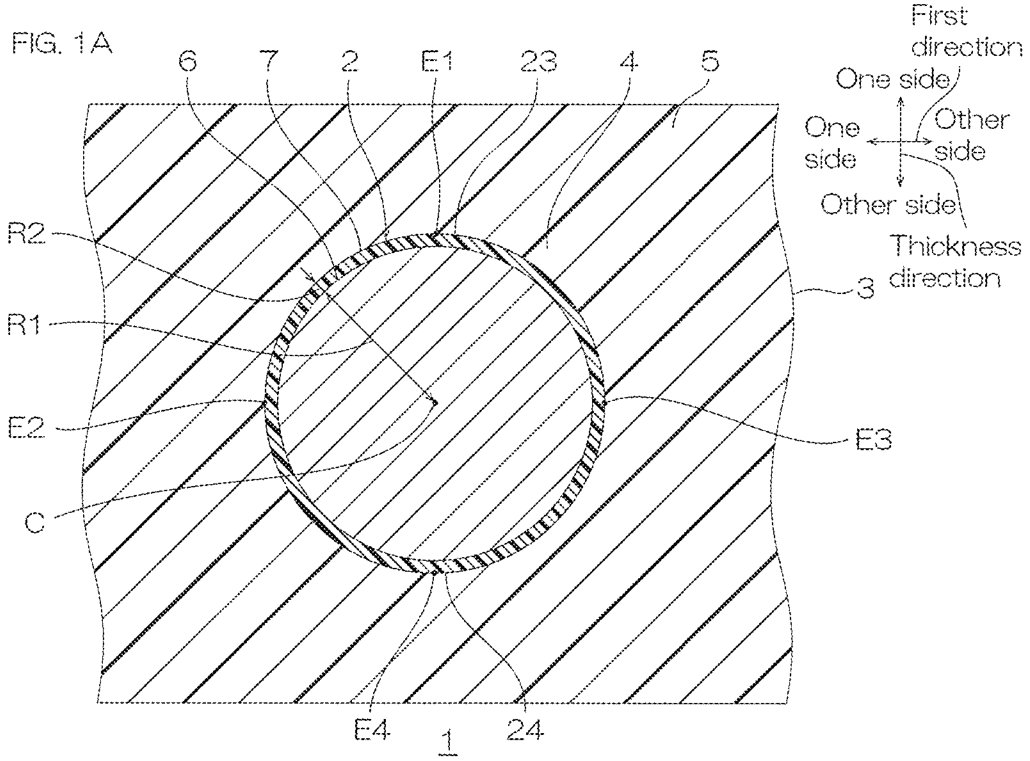
FIGS. 1A to 1B show cross-sectional views of a first embodiment of an inductor of the present invention.
Figure 1B:
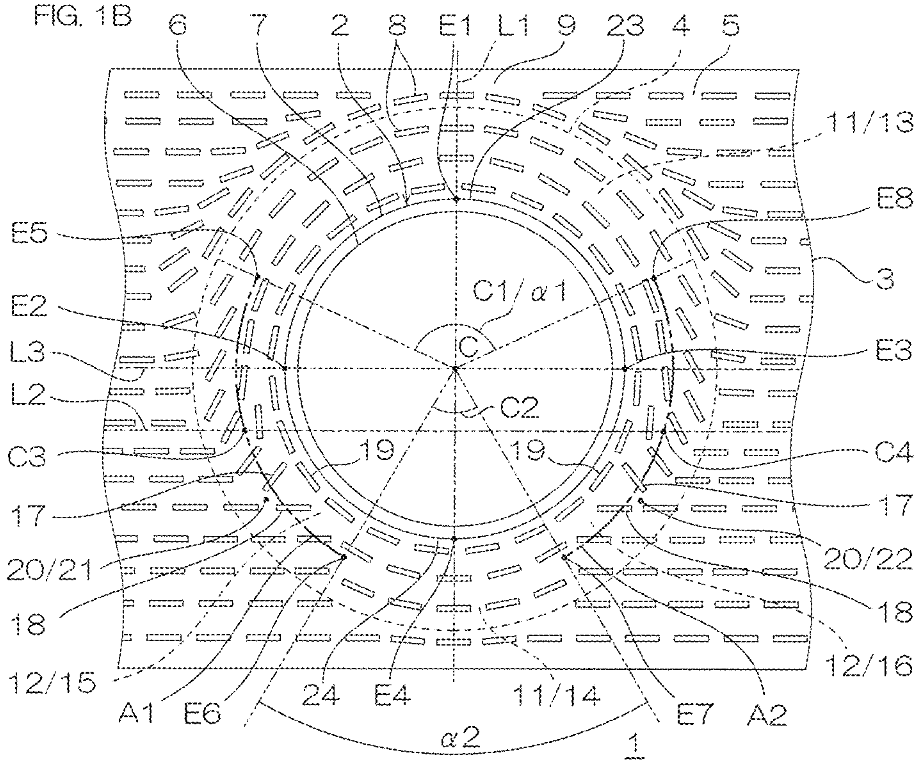

FIG. 1A is a cross-sectional view in which a cross section is hatched, and FIG. 1B is a cross-sectional view showing the orientation of anisotropic magnetic particles in a magnetic layer. In the drawings of the present application including FIG. 1B, in order to facilitate understanding of the present invention, a shape, an arrangement, and the like of magnetic particles (including the anisotropic magnetic particles) are exaggeratedly drawn.

As shown in FIGS. 1A to 1B, an inductor 1 has a shape extending in a plane direction. Specifically, the inductor 1 has one surface and the other surface facing each other in a thickness direction, and both one surface and the other surface have a flat shape along a first direction which is a direction included in the plane direction and is perpendicular to a direction (corresponding to the depth direction on the plane of the sheet) in which a wire 2 (described later) transmits an electric current and the thickness direction.

The inductor 1 includes the wire 2, and a magnetic layer 3.

The wire 2 has, for example, a generally circular shape in a cross-sectional view. Specifically, the wire 2 has a generally circular shape when cut in a cross section (cross section in the first direction) perpendicular to a second direction (transmission direction) (depth direction on the plane of the sheet) which is a direction for transmitting an electric current.

The wire 2 includes conducting line 6, and an insulating layer 7 covering it.

The conducting line 6 is a conducting line having a shape extending long in the second direction. Further, the conducting line 6 has a generally circular shape in a cross-sectional view sharing a central axis with the wire 2.

Examples of a material for the conducting line 6 include metal conductors such as copper, silver, gold, aluminum, nickel, and an alloy of these, and preferably, copper is used. The conducting line 6 may have a single-layer structure, or a multi-layer structure in which plating (for example, nickel) is applied to the surface of a core conductor (for example, copper).

A radius R1 of the conducting line 6 is, for example, 25 μm or more, preferably 50 μm or more, and for example, 2000 μm or less, preferably 200 μm or less.

The insulating layer 7 protects the conducting line 6 from chemicals and water, and also prevents a short circuit between the conducting line 6 and the magnetic layer 3. The insulating layer 7 covers the entire outer peripheral surface (circumferential surface) of the conducting line 6.

The insulating layer 7 has a generally circular ring shape in a cross-sectional view sharing a central axis (center C) with the wire 2.

Examples of a material for the insulating layer 7 include insulating resins such as polyvinyl formal, polyester, polyesterimide, polyamide (including nylon), polyimide, polyamideimide, and polyurethane. These may be used alone or in combination of two or more.

The insulating layer 7 may consist of a single layer or a plurality of layers.

A thickness R2 of the insulating layer 7 is generally uniform in a radial direction of the wire 2 at any position in a circumferential direction, and is, for example, 1 μm or more, preferably 3 μm or more, and for example, 100 μm or less, preferably 50 μm or less.

A ratio (R1/R2) of the radius R1 of the conducting line 6 to the thickness R2 of the insulating layer 7 is, for example, 1 or more, preferably 10 or more, and for example, 500 or less, preferably 100 or less.

A radius R of the wire 2 (=the radius R1 of the conducting line 6+the thickness R2 of the insulating layer 7) is, for example, 25 μm or more, preferably 50 μm or more, and for example, 2000 μm or less, preferably 200 μm or less.

The magnetic layer 3 improves inductance of the inductor 1. The magnetic layer 3 covers the entire outer peripheral surface (circumferential surface) of the wire 2. The magnetic layer 3 forms the outer shape of the inductor 1. Specifically, the magnetic layer 3 has a rectangular shape extending in the plane direction (the first direction and the second direction). More specifically, the magnetic layer 3 has one surface and the other surface facing each other in the thickness direction, and each of one surface and the other surface of the magnetic layer 3 forms each of one surface and the other surface of the inductor 1.

The magnetic layer 3 contains anisotropic magnetic particles 8 as one example of magnetic particles, and a binder 9. Specifically, a material for the magnetic layer 3 is a magnetic composition containing the anisotropic magnetic particles 8 and the binder 9. Preferably, the magnetic layer 3 is a cured product of a thermosetting resin composition (composition containing the anisotropic magnetic particles 8 and a thermosetting component to be described later).

Examples of a soft magnetic body include a single metal body containing one kind of metal element in a state of a pure material and an alloy body which is a eutectic (mixture) of one or more kinds of metal element (first metal element) and one or more kinds of metal element (second metal element) and/or non-metal element (carbon, nitrogen, silicon, phosphorus, and the like). These may be used alone or in combination.

An example of the single metal body includes a metal single body consisting of only one kind of metal element (first metal element). The first metal element is, for example, appropriately selected from metal elements that can be included as the first metal element of the soft magnetic body such as iron (Fe), cobalt (Co), nickel (Ni), and the like.

Further, examples of the single metal body include an embodiment including a core including only one kind of metal element and a surface layer including an inorganic material and/or an organic material which modify/modifies a portion of or the entire surface of the core, and an embodiment in which an organic metal compound and an inorganic metal compound including the first metal element are decomposed (thermally decomposed and the like). More specifically, an example of the latter embodiment includes an iron powder (may be referred to as a carbonyl iron powder) in which an organic iron compound (specifically, carbonyl iron) including iron as the first metal element is thermally decomposed. The position of a layer including the inorganic material and/or the organic material modifying a portion including only one kind of metal element is not limited to the above-described surface. The organic metal compound and the inorganic metal compound that can obtain the single metal body are not particularly limited, and can be appropriately selected from a known or conventional organic metal compound and inorganic metal compound that can obtain the single metal body of the soft magnetic body.

The alloy body is not particularly limited as long as it is a eutectic of one or more kinds of metal element (first metal element) and one or more kinds of metal element (second metal element) and/or non-metal element (carbon, nitrogen, silicon, phosphorus, and the like), and can be used as an alloy body of a soft magnetic body.

The first metal element is an essential element in the alloy body, and examples thereof include iron (Fe), cobalt (Co), and nickel (Ni). When the first metal element is Fe, the alloy body is referred to as an Fe-based alloy; when the first metal element is Co, the alloy body is referred to as a Co-based alloy; and when the first metal element is Ni, the alloy body is referred to as a Ni-based alloy.

The second metal element is an element (sub-component) which is secondarily contained in the alloy body, and is a metal element to be compatible with (eutectic to) the first metal element. Examples thereof include iron (Fe) (when the first metal element is other than Fe), cobalt (Co) (when the first metal element is other than Co), nickel (Ni) (when the first metal element is other than Ni), chromium (Cr), aluminum (Al), silicon (Si), copper (Cu), silver (Ag), manganese (Mn), calcium (Ca), barium (Ba), titanium (Ti), zirconium (Zr), hafnium (Hf), vanadium (V), niobium (Nb), tantalum (Ta), molybdenum (Mo), tungsten (W), ruthenium (Ru), rhodium (Rh), zinc (Zn), gallium (Ga), indium (In), germanium (Ge), tin (Sn), lead (Pb), scandium (Sc), yttrium (Y), strontium (Sr), and various rare earth elements. These may be used alone or in combination of two or more.

The non-metal element is an element (sub-component) which is secondarily contained in the alloy body and is a non-metal element which is compatible with (eutectic to) the first metal element. Examples thereof include boron (B), carbon (C), nitrogen (N), silicon (Si), phosphorus (P), and sulfur (S). These may be used alone or in combination of two or more.

Examples of the Fe-based alloy which is one example of an alloy body include magnetic stainless steel (Fe—Cr—Al—Si alloy) (including electromagnetic stainless steel), Sendust (Fe—Si—Al alloy) (including Supersendust), permalloy (Fe—Ni alloy), Fe—Ni—Mo alloy, Fe—Ni—Mo—Cu alloy, Fe—Ni—Co alloy, Fe—Cr alloy, Fe—Cr—Al alloy, Fe—Ni—Cr alloy, Fe—Ni—Cr—Si alloy, silicon copper (Fe—Cu—Si alloy), Fe—Si alloy, Fe—Si—B (—Cu—Nb) alloy, Fe—B—Si—Cr alloy, Fe—Si—Cr—Ni alloy, Fe—Si—Cr alloy, Fe—Si—Al—Ni—Cr alloy, Fe—Ni—Si—Co alloy, Fe—N alloy, Fe—C alloy, Fe—B alloy, Fe—P alloy, ferrite (including stainless steel ferrite and further, soft ferrite such as Mn—Mg ferrite, Mn—Zn ferrite, Ni—Zn ferrite, Ni—Zn—Cu ferrite, Cu—Zn ferrite, and Cu—Mg—Zn ferrite), Permendur (Fe—Co alloy), Fe—Co—V alloy, and Fe-based amorphous alloy.

Examples of the Co-based alloy which is one example of an alloy body include Co—Ta—Zr and a cobalt (Co)-based amorphous alloy.

An example of the Ni-based alloy which is one example of an alloy body includes a Ni—Cr alloy.

Of the soft magnetic bodies, from the viewpoint of magnetic properties, preferably, an alloy body is used, more preferably, a Fe-based alloy is used, further more preferably, Sendust (Fe—Si—Al alloy) is used. Further, as the soft magnetic body, preferably, a single metal body is used, more preferably, a single metal body containing an iron element in a state of a pure material is used, further more preferably, iron alone or an iron powder (carbonyl iron powder) is used.

Examples of a shape of the anisotropic magnetic particles 8 include a flat shape (plate shape) and a needle shape from the viewpoint of anisotropy, and preferably, a flat shape is used from the viewpoint of excellent relative magnetic permeability in the plane direction (two dimension).

A flat ratio (flatness) of the flat-shaped anisotropic magnetic particles 8 is, for example, 8 or more, preferably 15 or more, and for example, 500 or less, preferably 450 or less. The flat ratio is, for example, calculated as an aspect ratio obtained by dividing an average particle size (average length) (described later) of the anisotropic magnetic particles 8 by an average thickness of the anisotropic magnetic particles 8.

The average particle size (average length) of the anisotropic magnetic particles 8 is, for example, 3.5 μm or more, preferably 10 μm or more, and for example, 200 μm or less, preferably 150 μm or less. When the anisotropic magnetic particles 8 are flat-shaped, the average thickness thereof is, for example, 0.1 μm or more, preferably 0.2 μm or more, and for example, 3.0 μm or less, preferably 2.5 μm or less.

The binder 9 disperses the anisotropic magnetic particles 8 in the magnetic layer 3. Further, the binder 9 is dispersed in a predetermined direction in the magnetic layer 3. Preferably, the binder 9 contains a cured product of a thermosetting component in a B-stage state. The binder 9 is described in detail in the description of a first magnetic sheet 51, a second magnetic sheet 52, and a third magnetic sheet 53 in a producing method later.

In the magnetic layer 3, the anisotropic magnetic particles 8 are uniformly disposed, while being orientated in the binder 9.

The magnetic layer 3 has a peripheral region 4, and an outer-side region 5 in a cross-sectional view (when cut in a cross section in the first direction).

The peripheral region 4 is a peripheral region of the wire 2, and is located around the wire 2 so as to be in contact with the entire outer peripheral surface (circumferential surface) of the wire 2. The peripheral region 4 has a generally circular ring shape in a cross-sectional view sharing a central axis with the wire 2. More specifically, the peripheral region 4 is a region of the magnetic layer 3 traveling outwardly in the radial direction from the outer peripheral surface of the wire 2 by 1.5 times (preferably 1.2 times, more preferably 1 time, further more preferably 0.8 times, particularly preferably 0.5 times) the radius R of the wire 2 (average value of a distance from the center (center of gravity) C of the wire 2 to the outer peripheral surface).

The peripheral region 4 includes a first region 11 and a second region 12.

The two first regions 11 are disposed at spaced intervals to each other in the circumferential direction in the peripheral region 4. Specifically, the first region 11 includes a third region 13, and a fourth region 14 disposed at the other side in the thickness direction with respect to the third region 13 at spaced intervals thereto.

The third region 13 at least covers the outer peripheral circular arc surface including a thickness directional one end edge E1 of the wire 2, and at least covers, for example, a portion or all of a first semicircular arc (one semicircular arc connecting first directional both end edges E2 and E3 of the wire 2 at one side in the thickness direction of the wire 2) surface 23 including the thickness directional one end edge E1 of the wire 2. Preferably, the third region 13 covers a portion of the first semicircular arc surface 23 described above of the wire 2, and more specifically, when projected in the radial direction, the third region 13 is not overlapped with the first directional both end edges E2 and E3 of the wire 2 and is disposed inside the first directional both end edges E2 and E3, while included in one semicircular arc surface of the wire 2.

The thickness directional one end edge E1 of the wire 2 is a portion in which a first phantom line L1 passing through the center C of the wire 2 along the thickness direction and the circular arc surface (the first semicircular arc surface 23) at one side in the thickness direction of the wire 2 intersect.

Further, the first directional both end edges E2 and E3 of the wire 2 are two portions in which a third phantom line L3 passing through the center C of the wire 2 along the first direction and the circumferential surface of the wire 2 intersect.

The fourth region 14 is oppositely disposed across the center C of the wire 2 with respect to the third region 13. The fourth region 14 covers the outer peripheral circular arc surface including at least a thickness directional other end edge E4 of the wire 2, and covers, for example, a portion of a second semicircular arc (the other semicircular arc connecting the first directional both end edges E2 and E3 at the other side in the thickness direction of the wire 2) surface 24 including the thickness directional other end edge E4 of the wire 2. Specifically, when projected in the radial direction, the fourth region 14 is not overlapped with both end edges E2 and E3 in the first direction of the wire 2 and is disposed inside the first directional both end edges E2 and E3 of the wire 2, while included in the second semicircular arc surface 24 of the wire 2.

The thickness directional other end edge E4 of the wire 2 is a portion in which the first phantom line L1 passing through the center C of the wire 2 along the thickness direction and the second circular arc surface 24 intersect.

Each of an angle $\alpha$1 of a central angle C1 of the third region 13 and an angle $\alpha$2 of a central angle C2 of the fourth region 14 is appropriately set in accordance with the application and purpose, and the total angle ($\alpha$1+$\alpha$2) of these is, for example, below 360°, preferably 270° or less, and for example, above 180°, preferably 200° or more.

Specifically, the angle $\alpha$1 of the central angle C1 of the third region 13 is, for example, 90° or more, preferably above 90°, more preferably 120° or more, and for example, below 180°, preferably 165° or less. The angle $\alpha$1 is preferably an obtuse angle.

The angle $\alpha$2 of the central angle C2 of the fourth region 14 is, for example, 15° or more, and for example, 60° or less, preferably 45° or less. The angle $\alpha$2 is preferably a sharp angle.

The angle $\alpha$1 of the central angle C1 of the third region 13 is large with respect to the angle $\alpha$2 of the central angle C2 of the fourth region 14, and a ratio (angle $\alpha$1/angle $\alpha$2) of these is, for example, above 1, preferably 1.5 or more, and 3 or less, preferably 2 or less.

In the first region 11, the anisotropic magnetic particles 8 are orientated along the circumferential direction of the wire 2.

In each of the third region 13 and the fourth region 14, the direction of higher relative magnetic permeability of the anisotropic magnetic particles 8 (for example, when the anisotropic magnetic particles 8 are flat-shaped, the plane direction of the anisotropic magnetic particles 8) generally coincides with the circumferential direction. Specifically, a case where an angle formed by the plane direction of the anisotropic magnetic particles 8, and a tangent in contact with the circumferential surface facing the anisotropic magnetic particles 8 inwardly in the radial direction is 15° or less is defined that the anisotropic magnetic particles 8 are orientated in the circumferential direction.

A ratio of the number of the anisotropic magnetic particles 8 orientated in the circumferential direction is, for example, above 50%, preferably 70% or more, more preferably 80% or more with respect to the number of the entire anisotropic magnetic particles 8 included in the first region 11. That is, the first region 11 may include the anisotropic magnetic particles 8 which are not orientated in the circumferential direction by, for example, below 50%, preferably 30% or less, more preferably 20% or less.

A ratio of the area (total area of the third region 13 and the fourth region 14) of the first region 11 is, for example, 40% or more, preferably 50% or more, more preferably 60% or more, and for example, 90% or less, preferably 80% or less with respect to the entire peripheral region 4.

The relative magnetic permeability in the circumferential direction of the first region 11 is, for example, 5 or more, preferably 10 or more, more preferably 30 or more, and for example, 500 or less. The relative magnetic permeability of the radial direction is, for example, 1 or more, preferably 5 or more, and for example, 100 or less, preferably 50 or less, more preferably 25 or less. Further, a ratio (circumferential direction/radial direction) of the relative magnetic permeability of the circumferential direction to that of the radial direction is, for example, 2 or more, preferably 5 or more, and for example, 50 or less. When the relative magnetic permeability is within the above-described range, the inductance is excellent.

The relative magnetic permeability can be measured, for example, with an impedance analyzer (manufactured by Agilent Technologies Japan, Ltd., "4291B") using a magnetic material test fixture.

The second region 12 is a non-orientated region in the circumferential direction in which the anisotropic magnetic particles 8 are not orientated along the circumferential direction of the wire 2. In other words, in the second region 12, the anisotropic magnetic particles 8 are orientated along a direction other than the circumferential direction of the wire 2 (for example, the first direction or the radial direction) or not orientated.

The two second regions 12 are disposed at spaced intervals to each other in the circumferential direction in the peripheral region 4. Specifically, the second region 12 includes a fifth region 15 and a sixth region 16 which are disposed at spaced intervals to each other across the first phantom line L1 passing through the thickness directional one end edge E1 and other end edge E3 of the wire 2.

The fifth region 15 is disposed at one side in the first direction with respect to the first phantom line L1. The fifth region 15 is sandwiched between one end surface in the circumferential direction of the third region 13 and the other end surface in the circumferential direction of the fourth region 14, and specifically, is continuous to one end surface in the circumferential direction of the third region 13 and the other end surface in the circumferential direction of the fourth region 14.

The sixth region 16 is oppositely disposed at the other side in the first direction with respect to the fifth region 15 at spaced intervals thereto. The sixth region 16 is disposed at the other side in the first direction with respect to the first phantom line L1, and is linearly symmetrical with respect to the fifth region 15 with the first phantom line L1 as an axis. That is, the sixth region 16 is continuous with the other end surface in the circumferential direction of the third region 13, and one end surface in the circumferential direction of the fourth region 14.

Thus, in the first region 11, the third region 13, the fifth region 15, the fourth region 14, and, the sixth region 16 are disposed in order in the circumferential direction.

Then, the center C of the wire 2 is not present on a second phantom line L2 as one example of a phantom line connecting a center C3 of a first phantom circular arc A1 to a center C4 of a second phantom circular arc A2. The center C3 of the first phantom circular arc A1 is one example of a phantom circular arc connecting a first end E5 which is one end in the circumferential direction to a second end E6 which is the other end in the circumferential direction in the fifth region. The center C4 of the second phantom circular arc A2 is one example of a phantom circular arc connecting a third end E7 which is one end in the circumferential direction to a fourth end E8 which is the other end in the circumferential direction in the sixth region 16.

The first end E5 is a portion located at the central portion in the radial direction on one end surface in the circumferential direction in the fifth region 15. The second end E6 is a portion located at the central portion in the radial direction on the other end surface in the circumferential direction in the fifth region 15. The third end E7 is a portion located at the central portion in the radial direction on one end surface in the circumferential direction in the sixth region 16. The fourth end E8 is a portion located at the central portion in the radial direction on the other end surface in the circumferential direction in the sixth region 16.

Specifically, the center C of the wire 2 is disposed at one side in the thickness direction of the second phantom line L2 at spaced intervals thereto.

Specifically, the center C of the wire 2 is, for example, located at one side in the thickness direction by 0.2 times or more and 0.7 times or less the distance of the radius R of the wire 2 from the second phantom line L2, and is preferably located at one side in the thickness direction by 0.3 times or more and 0.5 times or less the distance of the radius R of the wire 2 from the second phantom line L2.

Further, the thickness directional other end edge E4 of the wire 2 is not present on the second phantom line L2, and specifically, is located at the other side in the thickness direction of the second phantom line L2 at spaced intervals thereto.

Further, in the second region 12 (each of the fifth region 15 and the sixth region 16), an intersection portion (top portion) 20 is formed by at least two different kinds of anisotropic magnetic particles 8 having a different orientated direction. For example, in the fifth region 15, first particles 17 which are the anisotropic magnetic particles 8 orientated outwardly in the radial direction of the wire 2 from the first end E5 (portion in contact with the third region 13) toward the second end E6 (portion in contact with the fourth region 14), and second particles 18 which are the anisotropic magnetic particles 8 orientated in the first direction from the second end E6 toward the first end E5 constitute at least two sides in a generally triangular shape, and thus, a first intersection portion (first top portion) 21 is formed. Specifically, the first particles 17 and the second particles 18, along with third particles 19 which are the anisotropic magnetic particles 8 orientated in the circumferential direction in a region with which the wire 2 is in closest contact in the fifth region 15, form a generally triangular shape (preferably, an acute angle triangular shape).

Further, in the sixth region 16, the first particles 17 which are the anisotropic magnetic particles 8 orientated outwardly in the radial direction of the wire 2 from the fourth end E8 (portion in contact with the third region 13) toward the third end E7 (portion in contact with the fourth region 14), and the second particles 18 which are the anisotropic magnetic particles 8 orientated in the first direction from the third end E7 toward the fourth end E8 constitute at least two sides in a generally triangular shape, and thus, a second intersection portion (second top portion) 22 is formed. Specifically, the first particles 17 and the second particles 18, along with the third particles 19 which are the anisotropic magnetic particles 8 orientated in the circumferential direction in a region with which the wire 2 is in closest contact in the sixth region 16, form a generally triangular shape (preferably, an acute angle triangular shape).

The intersection portion 20 (each of the first intersection portion 21 and the second intersection portion 22) is not overlapped with the center C of the wire 2 when projected in the first direction. Specifically, the intersection portion 20 is disposed at the other side in the thickness direction from the center C of the wire 2 at spaced intervals thereto when projected in the first direction.

Further, the intersection portion 20 is disposed at one side in the thickness direction of the thickness directional other end edge E4 of the wire 2 at spaced intervals thereto when projected in the first direction.

In the second region 12 (each of the fifth region 15 and the sixth region 16), the direction of higher relative magnetic permeability of the anisotropic magnetic particles 8 (for example, in the flat-shaped anisotropic magnetic particles, the plane direction of the particles) does not coincide with a tangent of the circumferential surface with the center C of the wire 2 as a center. More specifically, a case where an angle formed by the plane direction of the anisotropic magnetic particles 8, and the outer peripheral surface (circumferential surface) of the wire 2 at which the anisotropic magnetic particles 8 are located is above 15° is defined that the anisotropic magnetic particles 8 are not orientated in the circumferential direction.

A ratio of the number of the anisotropic magnetic particles 8 which are not orientated in the circumferential direction is, for example, above 50%, preferably 70% or more, and for example, 95% or less, preferably 90% or less with respect to the number of the entire anisotropic magnetic particles 8 included in the second region 12.

The second region 12 may include, for example, the anisotropic magnetic particles 8 orientated in the circumferential direction. A ratio of the number of the anisotropic magnetic particles 8 orientated in the circumferential direction is, for example, below 50%, preferably 30% or less, and for example, 5% or more, preferably 10% or more with respect to the number of the entire anisotropic magnetic particles 8 included in the second region 12.

When the anisotropic magnetic particles 8 orientated in the circumferential direction are included, preferably, the anisotropic magnetic particles 8 orientated in the circumferential direction are disposed at the innermost region of the second region 12, that is, in the vicinity of the surface of the wire 2.

A ratio of the area (total area of the fifth region 15 and the sixth region 16) of the second region 12 is, for example, 10% or more, preferably 20% or more, and for example, 60% or less, preferably 50% or less, more preferably 40% or less with respect to the entire peripheral region 4.

Then, in the peripheral region 4, a filling rate (presence ratio) of the anisotropic magnetic particles 8 is 40% by volume or more, preferably 45% by volume or more, more preferably 50% by volume or more, further more preferably 55% by volume or more, particularly preferably 60% by volume or more. When the filling rate of the anisotropic magnetic particles 8 in the peripheral region 4 is below the above-described lower limit, the inductor 1 cannot obtain excellent inductance.

A filling rate of the anisotropic magnetic particles 8 in the peripheral region 4 is, for example, 95% by volume or less, preferably 90% by volume or less. When the filling rate of the anisotropic magnetic particles 8 is the above-described upper limit or less, the inductor 1 has excellent mechanical strength.

In particular, in each of the first region 11 and the second region 12, the filling rate of the anisotropic magnetic particles 8 is, for example, 40% by volume or more, preferably 45% by volume or more, more preferably 50% by volume or more, further more preferably 55% by volume or more, particularly preferably 60% by volume or more, and for example, 95% by volume or less, preferably 90% by volume or less.

The filling rate of the anisotropic magnetic particles 8 in the first region 11 and the filling rate of the anisotropic magnetic particles 8 in the second region 12 may be any of the same or different from each other.

The filling rate of the anisotropic magnetic particles 8 can be calculated by measurement of the actual specific gravity, binarization of an SEM image, and the like.

On the other hand, a presence ratio of the binder 9 in the peripheral region 4 is, for example, the rest of the above-described filling rate of the anisotropic magnetic particles 8.

Further, in the peripheral region 4, the formation of a void (gap, space) is suppressed as much as possible, and preferably, a void between the wire 2 and the magnetic layer 3 is not present. That is, the peripheral region 4 is preferably a void-less.

The outer-side region 5 is a region other than the peripheral region 4 of the magnetic layer 3. The outer-side region 5 is disposed so as to be continuous with the peripheral region 4 outside the peripheral region 4.

In the outer-side region 5, the anisotropic magnetic particles 8 are orientated along the plane direction (particularly, the first direction).

In the outer-side region 5, the direction of high relative magnetic permeability of the anisotropic magnetic particles 8 (for example, in the flat-shaped anisotropic magnetic particles, the plane direction of the particles) generally coincides with the first direction. More specifically, a case where an angle formed by the plane direction of the anisotropic magnetic particles 8, and the first direction is 15° or less is defined that the anisotropic magnetic particles 8 are orientated in the first direction.

In the outer-side region 5, a ratio of the number of the anisotropic magnetic particles 8 orientated in the first direction is above 50%, preferably 70% or more, more preferably 90% or more with respect to the number of the entire anisotropic magnetic particles 8 included in the outer-side region 5. That is, the outer-side region 5 may include the anisotropic magnetic particles 8 which are not orientated in the first direction by below 50%, preferably 30% or less, more preferably 10% or less.

The filling rate of the anisotropic magnetic particles 8 in the outer-side region 5 and the filling rate of the anisotropic magnetic particles 8 in the peripheral region 4 may be the same or different from each other.

In the outer-side region 5, the relative magnetic permeability of the first direction is, for example, 5 or more, preferably 10 or more, more preferably 30 or more, and for example, 500 or less. The relative magnetic permeability of the thickness direction is, for example, 1 or more, preferably 5 or more, and for example, 100 or less, preferably 50 or less, more preferably 25 or less. Further, a ratio (first direction/thickness direction) of the relative magnetic permeability of the first direction to that of the thickness direction is, for example, 2 or more, preferably 5 or more, and for example, 50 or less.

In the outer-side region 5, the filling rate of the anisotropic magnetic particles 8 is not particularly limited, and is, for example, 40% by volume or more, preferably 45% by volume or more, more preferably 50% by volume or more, further more preferably 55% by volume or more, particularly preferably 60% by volume or more, and for example, 95% by volume or less, preferably 90% by volume or less.

A thickness of the magnetic layer 3 is, for example, 2 times or more, preferably 3 times or more, and for example, 20 times or less the radius R of the wire 2. Specifically, the thickness of the magnetic layer 3 is, for example, 100 μm or more, preferably 200 μm or more, and for example, 2000 μm or less, preferably 1000 μm or less. The thickness of the magnetic layer 3 is a distance between one surface and the other surface of the magnetic layer 3.

2. Producing Method of Inductor

A method for producing the inductor 1 is described with reference to FIGS. 2A to 3F.

The method for producing the inductor 1 includes a first step to a sixth step. In the method for producing the inductor 1, a first step, a second step, and a third step are carried out in order, and then, a fourth step, a fifth step, and a sixth step are carried out simultaneously.

(First Step)

Figures 2A, 2B, 2C:
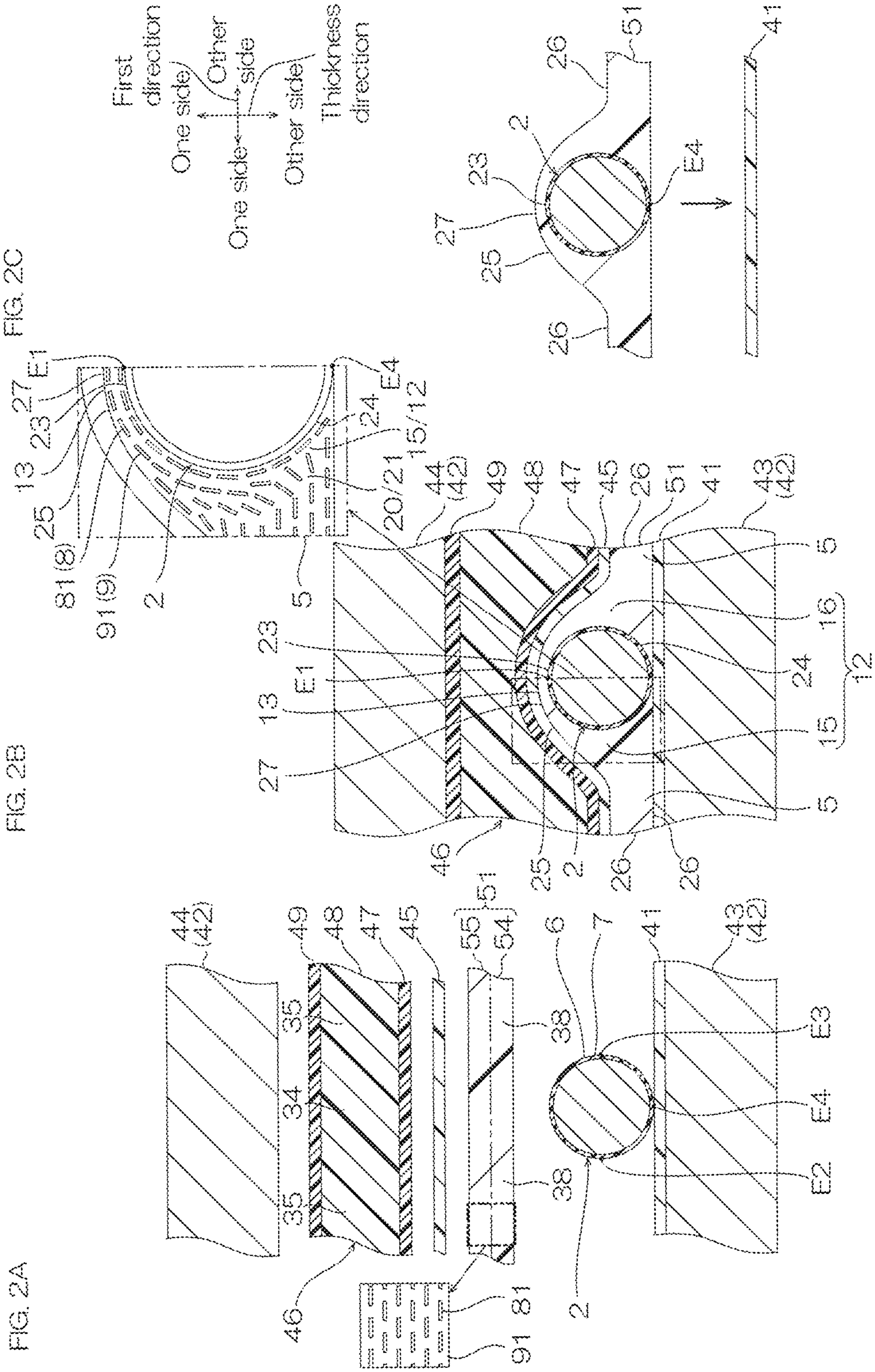
FIGS. 2A to 2C show process views for illustrating a method for producing an inductor of a first embodiment.

As shown in FIG. 2A, in the first step, first, the wire 2, and a first release sheet 41 as a release film which is one example of a substrate are prepared.

The first release sheet 41 has a generally sheet shape extending in the plane direction. A material for the first release sheet 41 is appropriately selected in accordance with its application and purpose, and specifically, examples thereof include polyesters such as polyethylene terephthalate (PET) and polyolefins such as polymethylpentene and polypropylene. Further, one surface and/or the other surface in the thickness direction of the first release sheet 41 may be subjected to a release treatment. A thickness of the first release sheet 41 is, for example, 1 μm or more, and for example, 1000 μm or less.

Thereafter, in the first step, the wire 2 and the first release sheet 41 are disposed in a flat plate press 42.

The flat plate press 42 includes a first plate 43 and a second plate 44 which can be pressurized in the thickness direction. In the flat plate press 42, the second plate 44 is oppositely disposed at one side in the thickness direction of the first plate 43 at spaced intervals thereto. The flat plate press 42 includes a heat source which is not shown.

Further, in the flat plate press 42, a chamber for bringing a member disposed in the flat plate press 42 to be subjected to pressing into a vacuum state is provided.

In the first step, first, the first release sheet 41 is disposed on the first plate 43, and then, the wire 2 is disposed on one surface in the thickness direction of the first release sheet 41. Specifically, the thickness directional other end edge E4 of the wire 2 is brought into contact with one surface of the first release sheet 41.

At this time, the first release sheet 41 and the first plate 43 are disposed in the chamber. Each member disposed in the subsequent steps is disposed within the chamber.

(Second Step)

In the second step, first, as shown in FIG. 2A, the first magnetic sheet 51 is prepared. At the same time, a second release sheet 45 and a release cushion sheet 46 are prepared.

[First Magnetic Sheet]

The first magnetic sheet 51 has a generally sheet shape extending in the plane direction. Specifically, the first magnetic sheet 51 has one surface and the other surface facing each other in the thickness direction.

The first magnetic sheet 51 is a magnetic sheet for forming at least (a portion or all of) the second region 12 and the third region 13 in the magnetic layer 3, and a portion of the outer-side region 5.

The first magnetic sheet 51 is configured to deform (flow) by thermal pressing in the second step (ref: FIG. 2B).

The first magnetic sheet 51 contains first anisotropic magnetic particles 81 as one example of first magnetic particles, and a first binder 91. The first anisotropic magnetic particles 81 are the same as the anisotropic magnetic particles 8. Specifically, the first magnetic sheet 51 is formed from a first magnetic composition containing the first anisotropic magnetic particles 81 and the first binder 91 into a generally sheet shape.

In the first magnetic sheet 51, the first anisotropic magnetic particles 81 are uniformly dispersed by the first binder 91 so as to be orientated in the plane direction.

The first magnetic sheet 51 is a laminate (laminated sheet) of a single sheet or a plurality of sheets, preferably, is a laminated sheet, and more preferably, is a two-layer sheet consisting of an inner-side sheet 54 in contact with the wire 2 during the thermal pressing and an outer-side sheet 55 disposed on one side in the thickness direction of the inner-side sheet 54.

A volume ratio of the first anisotropic magnetic particles 81 in the first magnetic composition (the first magnetic sheet 51) is, for example, 40% by volume or more, preferably 45% by volume or more, more preferably 50% by volume or more, further more preferably 55% by volume or more, particularly preferably 60% by volume or more, and for example, 95% by volume or less, preferably 90% by volume or less. When the volume ratio of the first anisotropic magnetic particles 81 is within the above-described range, in the peripheral region 4, the filling rate of the anisotropic magnetic particles 8 can be set to 40% by volume or more. Thus, it is possible to obtain the inductor 1 having excellent inductance.

Also, the volume ratio of the first anisotropic magnetic particles 81 in the first magnetic composition (the first magnetic sheet 51) is preferably, for example, 40% by volume or less, further 35% by volume or less, and 20% by volume or more, further 25% by volume or more. When the volume ratio of the first anisotropic magnetic particles 81 is within the above-described range, the presence of a void in the peripheral region 4 can be suppressed as much as possible, and therefore, the filling rate of the anisotropic magnetic particles 8 in the peripheral region 4 can be set to 40% by volume or more along with the second magnetic sheet 52 and the third magnetic sheet 53 (described later) having a relatively high filling rate of the anisotropic magnetic particles 8. As a result, it is possible to obtain the inductor 1 having excellent inductance.

When the first magnetic sheet 51 is a two-layer laminated sheet of the inner-side sheet 54 and the outer-side sheet 55, the volume ratio of the anisotropic magnetic particles 8 of the outer-side sheet 55 is preferably high than that of the inner-side sheet 54. That way, the first magnetic sheet 51 can more flexibly follow a region exceeding 180° in a cross-sectional view in the circumferential surface of the wire 2 (hereinafter, referred to as a superior arc).

Examples of the first binder 91 include thermoplastic components such as an acrylic resin and thermosetting components such as an epoxy resin composition. An example of the acrylic resin includes a carboxyl group-containing acrylic acid ester copolymer. The epoxy resin composition includes, for example, an epoxy resin (cresol novolak-type epoxy resin and the like) as a main agent, a curing agent for an epoxy resin (phenol resin and the like), and a curing accelerator for an epoxy resin (imidazole compound and the like).

As the first binder 91, a thermoplastic component and a thermosetting component may be used alone or in combination, preferably, a thermoplastic component and a thermosetting component are used in combination.

In other words, preferably, the first binder 91 contains at least a thermosetting component. When the first binder 91 contains at least a thermosetting component, while the first anisotropic magnetic particles 81 in a B-stage state having fluidity can be uniformly dispersed in the first magnetic sheet 51 at a high mixing ratio, the first magnetic sheet 51 can be flexibly deformed and follow the superior arc in the circumferential surface of the wire 2 during the thermal pressing of the second step to cover the wire 2.

A more detailed formulation of the first binder 91 (the first magnetic composition) is described in Japanese Unexamined Patent Publication No. 2014-165363 and the like.

The volume ratio of the first binder 91 in the first magnetic composition (the first magnetic sheet 51) is the rest of the volume ratio of the first anisotropic magnetic particles 81 described above.

To fabricate the first magnetic sheet 51, the first anisotropic magnetic particles 81 and the first binder 91 are blended to be uniformly mixed, and a first magnetic composition is prepared. At this time, if necessary, a varnish of the first magnetic composition is prepared by using a solvent (organic solvent). Thereafter, the varnish is applied to a release film which is not shown to be dried, and the first magnetic sheet 51 is fabricated.

The thickness of the first magnetic sheet 51 (in the case of the laminated sheet, the total thickness) is appropriately set so that the shape capable of covering at least the thickness directional one end edge E1 of the wire 2 of the outer-side region 5 can be retained by the thermal pressing in the second step. Specifically, the thickness of the first magnetic sheet 51 is, for example, 3 times or less, preferably 2 times or less, more preferably below 2 times, further more preferably 1.5 times or less, particularly preferably 1.25 times or less, and for example, 0.1 times or more, preferably 0.2 times or more the radius R of the wire 2.

(Second Release Sheet)

The second release sheet 45 has the same configuration as that of the first release sheet 41, and a material thereof is appropriately selected from the description above in accordance with its application and purpose.

(Release Cushion Sheet)

The release cushion sheet 46 is a release sheet capable of releasing the first magnetic sheet 51 from the second plate 44 after the thermal pressing (ref: FIG. 2C) in the second step to be described next. The release cushion sheet 46 is also a cushion sheet for dispersing a pressure of the second plate 44 corresponding to the shape of the superior arc of the circumferential surface of the wire 2 to act on the first magnetic sheet 51 at the time of the thermal pressing in the second step (ref: FIG. 2B), causing deformation in the first magnetic sheet 51, and allowing the first magnetic sheet 51 to follow the superior arc of the circumferential surface of the wire 2.

The release cushion sheet 46 has a sheet shape extending in the plane direction, and has one surface and the other surface in the thickness direction.

One surface of the release cushion sheet 46 can be planarly in contact with the second plate 44 (described later) in the second step. One surface of the release cushion sheet 46 is a flat surface along the plane direction.

The other surface of the release cushion sheet 46 can be in contact with one surface in the thickness direction of the second release sheet 45 to deform the first magnetic sheet 51. The other surface of the release cushion sheet 46 is oppositely disposed at the other side in the thickness direction with respect to one surface at spaced intervals thereto. The other surface of the release cushion sheet 46 is parallel to one surface, and is a flat surface along the plane direction.

The release cushion sheet 46 includes a first layer 47, a second layer 48, and a third layer 49 in order at one side in the thickness direction.

(First Layer)

The first layer 47 is a release layer (first release layer) with respect to the first magnetic sheet 51. The first layer 47 is a thin film (skin film) having a shape extending along the plane direction. The first layer 47 is also a cover layer (outer shell layer) covering the second layer 48 to be described next from the other side in the thickness direction. The other surface in the thickness direction of the first layer 47 may be subjected to an appropriate release treatment.

The first layer 47 has properties of not substantially changing in thickness before and after the thermal pressing, while capable of following one surface of the first magnetic sheet 51 through the second release sheet 45 in the thermal pressing in the next second step. Further, in the thermal pressing, the first layer 47 is a layer that can extend in the plane direction (specifically, the first direction). The first layer 47 is harder than the second layer 48 to be described next at a temperature of the thermal pressing in the second step (for example, 110° C.).

An example of a material for the first layer 47 includes a non-thermal hydraulic material which does not flow at least in the first direction by the thermal pressing in the second step to be described later.

The non-thermal hydraulic material contains, for example, an aromatic polyester such as polybutylene terephthalate (PBT), a polyolefin, and the like as a main component.

(Second Layer)

The second layer 48 is an intermediate layer sandwiched between the first layer 47 and the third layer 49. The second layer 48 is a fluidized layer which flows in the first direction and the thickness direction at the time of the thermal pressing in the second step, and allows the first layer 47 to follow one surface of the first magnetic sheet 51.

The second layer 48 is a soft layer which is softer than the first layer 47, and specifically, can be deformed at the time of the thermal pressing in the second step. Specifically, a tensile storage elastic modulus E' at 110° C. of the second layer 48 is, for example, lower than the tensile storage elastic modulus E' at 110° C. of the first layer 47.

A material for the second layer 48 includes a thermal hydraulic material which flows in the first direction and the thickness direction by the thermal pressing in the second step to be described later. The thermal hydraulic material includes, for example, an olefin-(meth)acrylate copolymer (ethylene-methyl(meth)acrylate copolymer and the like) and an olefin-vinyl acetate copolymer as a main component.

(Third Layer)

The third layer 49 is a release layer (second release layer) with respect to the second plate 44. A shape, properties, a material, and a thickness of the third layer 49 are the same as those of the first layer 47.

(Thickness of Release Cushion Sheet)

A thickness of the release cushion sheet 46 is, for example, 50 μm or more, and for example, 500 μm or less. A thickness of each of the first layer 47 and the third layer 49 is, for example, 5 μm or more, and 50 μm or less, and a thickness of the second layer 48 is, for example, 30 μm or more, and 300 μm or less. A ratio of the thickness of the second layer 48 is, for example, 2 or more, preferably 5 or more, more preferably 7 or more, and for example, 15 or less with respect to the thickness of the first layer 47.

A commercially available product can be used as the release cushion sheet 46, and examples thereof include the release film OT series such as release film OT-A and release film OT-E (manufactured by SEKISUI CHEMICAL CO., LTD.).

Then, the first release sheet 41, the wire 2, the first magnetic sheet 51, the second release sheet 45, and the release cushion sheet 46 are sandwiched in order by the flat plate press 42.

Subsequently, the wire 2 and the first magnetic sheet 51 are thermally pressed by the flat plate press 42 through the first release sheet 41, the second release sheet 45, and the release cushion sheet 46.

For example, the second plate 44 is moved so as to be close to the first plate 43, and the second plate 44 is pushed (pressed) toward the first magnetic sheet 51 through the release cushion sheet 46 and the second release sheet 45.

At the same time, the first magnetic sheet 51 and the release cushion sheet 46 are heated by a heat source.

A pressing pressure is, for example, 0.1 MPa or more, preferably 0.3 MPa or more, and for example, 10 MPa or less, preferably 5 MPa or less.

A heating temperature is specifically, for example, 100° C. or more, preferably 105° C. or more, and for example, 190° C. or less, preferably 150° C. or less.

The pressing time is, for example, 10 seconds or more, preferably 20 seconds or more, and for example, 1000 seconds or less, preferably 100 seconds or less.

In the second step, the second plate 44 is moved with respect to the first plate 43, so that the chamber is closed, and subsequently, the atmosphere in the chamber is brought into a vacuum state. Subsequently, in the first plate 43, the first release sheet 41, the wire 2, the first magnetic sheet 51, the second release sheet 45, the release cushion sheet 46, and the second plate 44, members adjacent to each other in the thickness direction are get in contact (tight contact, adhesively contact) with each other, and then, the movement of the second plate 44 is further progressed (thermal pressing starts).

Then, when projected in the thickness direction, in the release cushion sheet 46, an overlapped portion 34 which is overlapped with the wire 2 is pressed (compressed), while being sandwiched in the thickness direction by the first semi-circular arc surface 23 of the wire 2 and the second plate 44.

On the other hand, when projected in the thickness direction, a non-overlapped portion 35 which is not overlapped with the wire 2 in the release cushion sheet 46 is not subjected to the above-described compression.

Then, the thermal hydraulic material in the overlapped portion 34 of the second layer 48 flows (is extruded) (deforms) (specifically, plastically deforms) toward the non-overlapped portion 35. Then, in the non-overlapped portion 35, a flow pressure based on the flow (extrusion) of the thermal hydraulic material from the above-described overlapped portion 34 is increased. The flow pressure in the non-overlapped portion 35 acts on both sides in the thickness direction.

Of the flow pressure, the flow pressure acting on the other side in the thickness direction extrudes (pushes down) the first layer 47 in the non-overlapped portion 35 toward the other side in the thickness direction, and extrudes (pushes down) an extruded portion 38 facing the non-overlapped portion 35 in the thickness direction in the first magnetic sheet 51 toward the other side in the thickness direction through the first layer 47.

Thereafter, the extrusion (pushing down) of the extruded portion 38 based on the above-described flow pressure continues until the extruded portion 38 wraps around the first directional both end edges E2 and E3 of the wire 2, and further covers (is brought into contact with) the second circular arc surface 24 (excluding the thickness directional other end edge E4) of the wire 2.

Then, the extruded portion 38 is brought into contact with the second circular arc surface 24, so that as shown in FIG. 2B, the second region 12 is formed.

After the thermal pressing, the other surface of the release cushion sheet 46 has, for example, a shape corresponding to the first semi-circular arc surface 23 of the wire 2.

The second release sheet 45 follows the other surface of the release cushion sheet 46, and specifically, follows the first layer 47.

The first magnetic sheet 51 after the thermal pressing is, for example, in a B-stage state. Specifically, the thermosetting component contained in the first binder 91 of the first magnetic sheet 51 is in a B-stage state.

Thus, the first magnetic sheet 51 after the thermal pressing has a shape including at least the above-described second region 12. That is, as shown by an enlarged view of FIG. 2B, in the second region 12, the anisotropic magnetic particles 8 are not orientated along the circumferential direction of the wire 2.

Further, the first magnetic sheet 51 has a raised portion 25 and a flat portion 26.

The raised portion 25 covers the outer peripheral surface of the wire 2 (excluding the other end edge E4 in the thickness direction), and has a curved shape in a cross-sectional view which is similar to the first semi-circular arc surface 23. The raised portion 25 has a shape in which the center in the first direction protrudes (is raised) toward one side in the thickness direction. The raised portion 25 has one second top portion 27.

The flat portion 26 has a generally flat plate shape extending from both end surfaces in the first direction of the raised portion 25 toward each of both outer sides in the first direction.

Thus, the first magnetic sheet 51 is disposed on one surface in the thickness direction of the first release sheet 41 so as to cover the superior arc of the circumferential surface of the wire 2.

The superior arc of the circumferential surface of the wire 2 is a circular arc surface (a portion of the circumferential surface) which goes from the first semi-circular arc surface 23 and each of both ends in the circumferential direction thereof toward the thickness directional other end edge E4 along the circumferential direction, and does not reach the thickness directional other end edge E4.

The thickness of the first magnetic sheet 51 after the thermal pressing is set so that the above-described shape having the raised portion 25 and the flat portion 26 is ensured. Specifically, a ratio of the thickness of the second top portion 27 of the first magnetic sheet 51 is, for example, 0.01 or more, preferably 0.03 or more, and for example, 8 or less, preferably 2 or less with respect to the radius R of the wire 2. A ratio of the thickness of the flat portion 26 is, for example, 0.05 or more, preferably 0.2 or more, and for example, below 5, preferably 1.5 or less with respect to the radius R of the wire 2.

Specifically, the thickness of the first magnetic sheet 51 in the second top portion 27 is, for example, 1 μm or more, preferably 5 μm or more, and for example, 200 μm or less, preferably 100 μm or less. Further, the thickness of the flat portion 26 is, for example, 25 μm or more, preferably 50 μm or more, and for example, 200 μm or less, preferably 150 μm or less.

(Third Step)

In the third step, first, the pressing of the flat plate press 42 shown in FIG. 2B is released, then, the first release sheet 41, the wire 2, the first magnetic sheet 51, the second release sheet 45, and the release cushion sheet 46 are taken out from the flat plate press 42.

Subsequently, as shown in FIG. 2C, the first release sheet 41 is peeled from the other surface of the first magnetic sheet 51 and the thickness directional other end edge E4 of the wire 2.

Further, the second release sheet 45 and the release cushion sheet 46 are peeled from one surface of the first magnetic sheet 51.

(Fourth Step, Fifth Step, and Sixth Step)

Figure 3F:
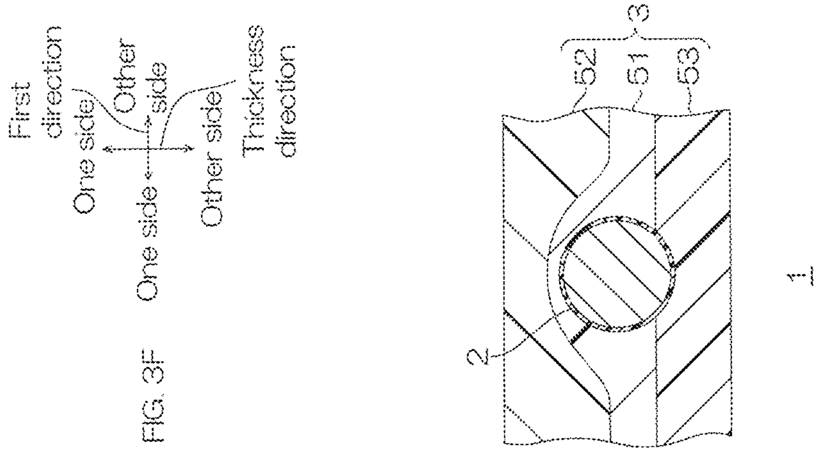
FIGS. 3D to 3F, subsequent to FIG. 2C, show process views for illustrating the method for producing an inductor of the first embodiment.
Figure 3E:
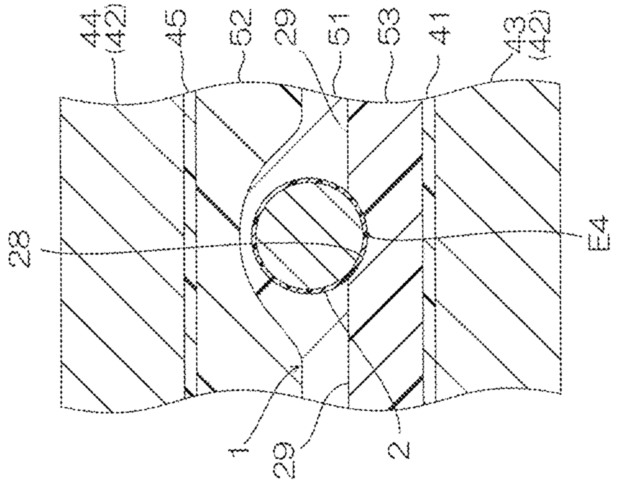

As shown in FIG. 3E, the fourth step, the fifth step, and the sixth step are carried out simultaneously.

Figure 3D:
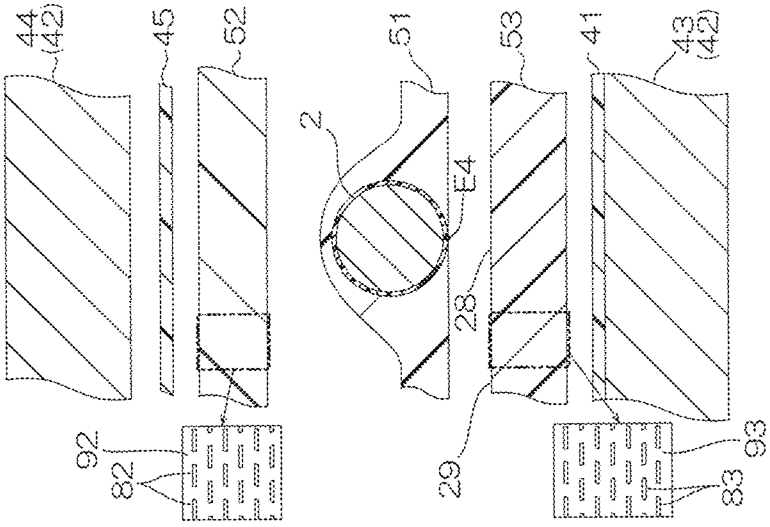

In the fourth step, the second magnetic sheet 52 covers one surface in the thickness direction of the first magnetic sheet 51. In the fifth step, the third magnetic sheet 53 covers the other surface in the thickness direction of the first magnetic sheet 51. In the sixth step, the thermosetting components of the first binder 91 (ref: FIG. 2A), a second binder 92 (ref: FIG. 3D), and a third binder 93 (ref: FIG. 3D) are brought into a C-stage state.

As shown in FIG. 3D, in the fourth step and the fifth step, first, the second magnetic sheet 52 and the third magnetic sheet 53 are prepared.

Each of the second magnetic sheet 52 and the third magnetic sheet 53 may have the same configuration as the first magnetic sheet 51.

The second magnetic sheet 52 contains second anisotropic magnetic particles 82 and the second binder 92, and in the second binder 92, the second anisotropic magnetic particles 82 are, for example, orientated in the plane direction. Since the thermosetting component contained in the second binder 92 is in a B-stage state, the second magnetic sheet 52 is in a B-stage state. Further, when the second magnetic sheet 52 is a laminate (laminated sheet), a presence ratio of the second anisotropic magnetic particles 82 in each sheet is the same or different, and preferably, is the same. The presence ratio of the second anisotropic magnetic particles 82 in the second magnetic sheet 52 may be the same as or different from the presence ratio of the first anisotropic magnetic particles 81.

When the presence ratio of the second anisotropic magnetic particles 82 is different from that of the first anisotropic magnetic particles 81, and when the presence ratio of the first anisotropic magnetic particles 81 is 40% by volume or less, the presence ratio of the second anisotropic magnetic particles 82 can be set higher than that of the first anisotropic magnetic particles 81. Specifically, a ratio (presence ratio of the second anisotropic magnetic particles 82 in the second magnetic sheet 52/presence ratio of the first anisotropic magnetic particles 81 in the first magnetic sheet 51) of the presence ratio of the second anisotropic magnetic particles 82 in the second magnetic sheet 52 to that of the first anisotropic magnetic particles 81 in the first magnetic sheet 51 is, for example, 1.1 or more, preferably 1.2 or more, more preferably 1.5 or more, and for example, 3 or less, preferably 2.5 or less. In that case, specifically, the presence ratio of the second anisotropic magnetic particles 82 in the second magnetic sheet 52 is, for example, 45% by volume or more, preferably 50% by volume or more, more preferably 55% by volume or more, further more preferably 60% by volume or more, and for example, 95% by volume or less, preferably 90% by volume or less.

When the ratio and/or the presence ratio described above of the second anisotropic magnetic particles 82 are/is within the above-described range, the presence of a void between the second magnetic sheet 52 and the first magnetic sheet 51 can be suppressed as much as possible, and therefore, the filling rate of the anisotropic magnetic particles 8 in the peripheral region 4, along with the first magnetic sheet 51, can be set to 40% by volume or more. As a result, it is possible to obtain the inductor 1 having excellent inductance.

A thickness of the second magnetic sheet 52 (in the case of the laminated sheet, the total thickness) is, for example, 0.5 times or more, preferably 1 time or more, more preferably 1.5 times or more, and for example, 5 times or less, preferably 3 times or less the radius R of the wire 2.

The third magnetic sheet 53 contains third anisotropic magnetic particles 83 as one example of third magnetic particles and the third binder 93, and in the third binder 93, the third anisotropic magnetic particles 83 are, for example, orientated in the plane direction. Since the thermosetting component contained in the third binder 93 is in a B-stage state, the third magnetic sheet 53 is in a B-stage state. Further, when the third magnetic sheet 53 is a laminate (laminated sheet), a presence ratio of the third anisotropic magnetic particles 83 in each sheet is the same or different, and preferably, is the same. The presence ratio of the third anisotropic magnetic particles 83 in the third magnetic sheet 53 may be the same as or different from the presence ratio of the first anisotropic magnetic particles 81.

When the presence ratio of the third anisotropic magnetic particles 83 is different from that of the first anisotropic magnetic particles 81, and when the presence ratio of the first anisotropic magnetic particles 81 is 40% by volume or less, the presence ratio of the third anisotropic magnetic particles 83 can be set higher than that of the first anisotropic magnetic particles 81. Specifically, a ratio (presence ratio of the third anisotropic magnetic particles 83 in the third magnetic sheet 53/presence ratio of the first anisotropic magnetic particles 81 in the first magnetic sheet 51) of the presence ratio of the third anisotropic magnetic particles 83 in the third magnetic sheet 53 to that of the first anisotropic magnetic particles 81 in the first magnetic sheet 51 is, for example, 1.1 or more, preferably 1.2 or more, more preferably 1.5 or more, and for example, 2.5 or less, preferably 2 or less. In that case, specifically, the presence ratio of the third anisotropic magnetic particles 83 in the third magnetic sheet 53 is, for example, 40% by volume or more, preferably 45% by volume or more, more preferably 50% by volume or more, further more preferably 55% by volume or more, particularly preferably 60% by volume or more, and for example, 95% by volume or less, preferably 90% by volume or less.

When the ratio and/or the presence ratio described above of the third anisotropic magnetic particles 83 are/is within the above-described range, the presence of a void between the third magnetic sheet 53 and the first magnetic sheet 51 can be suppressed as much as possible, and therefore, the filling rate of the anisotropic magnetic particles 8 in the peripheral region 4, along with the first magnetic sheet 51, can be set to 40% by volume or more. Accordingly, it is possible to obtain the inductor 1 having excellent inductance.

A thickness of the third magnetic sheet 53 (in the case of the laminated sheet, the total thickness) is, for example, 0.5 times or more, preferably 1 time or more, and for example, 5 times or less, preferably 3 times or less the radius R of the wire 2.

Next, the second magnetic sheet 52 and the third magnetic sheet 53 are disposed in the flat plate press 42. Specifically, the first release sheet 41, the third magnetic sheet 53, the wire 2, the first magnetic sheet 51, the second magnetic sheet 52, and the second release sheet 45 are disposed in order toward one side in the thickness direction between the first plate 43 and the second plate 44.

As the first release sheet 41 and/or the second release sheet 45, the first release sheet 41 and/or the second release sheet 45 removed in the above-described third step may be reused, or another first release sheet 41 and/or second release sheet 45 may be prepared and disposed.

In the thermal pressing of the fourth step and the fifth step, the release cushion sheet 46 as used in the second step is not disposed in the flat plate press 42.

Next, the third magnetic sheet 53, the wire 2, the first magnetic sheet 51, and the second magnetic sheet 52 are thermally pressed by the flat plate press 42. The conditions of the thermal pressing are the same as those of the second step.

By the thermal pressing, the other surface of the second magnetic sheet 52 follows the shape of the raised portion 25 of the first magnetic sheet 51. However, one surface of the second magnetic sheet 52 retains its flat shape.

That is, the second magnetic sheet 52 covers the superior arc of the circumferential surface of the wire 2, and one surface in the thickness direction of the first magnetic sheet 51 covering one surface of the first release sheet 41 (practice of the fourth step).

Further, the other surface of the third magnetic sheet 53 retains its flat shape by the thermal pressing.

On the other hand, on one surface of the third magnetic sheet 53, an opposing portion 28 facing the thickness directional other end edge E4 of the wire 2 is slightly moved (retracted, lowered, sunk) toward the other side in the thickness direction. That is, on one surface of the third magnetic sheet 53, the opposing portion 28 is moved outwardly in the first direction, and slightly recessed toward one side in the thickness direction with respect to the second flat portion 29 parallel to one surface of the first release sheet 41.

The other surface of the first magnetic sheet 51 is in tight contact with the second flat portion 29 of one surface of the third magnetic sheet 53, and is slightly moved toward one side in the thickness direction with respect to the thickness directional other end edge E4 of the wire 2.

That is, the third magnetic sheet 53 is disposed on the other surface in the thickness direction of the first magnetic sheet 51 so as to cover the circumferential surface (circular arc surface including the thickness directional other end edge E4) of the wire 2 exposed from the other surface in the thickness direction of the first magnetic sheet 51 (practice of the fifth step).

Thus, in a portion overlapped with the wire 2 when projected in the thickness direction, the third magnetic sheet 53, the wire 2, the first magnetic sheet 51, and the second magnetic sheet 52 are disposed in order toward one side in the thickness direction. Further, in a portion which is not overlapped with the wire 2 when projected in the thickness direction, the third magnetic sheet 53, the first magnetic sheet 51, and the second magnetic sheet 52 are disposed in order toward one side in the thickness direction.

The sixth step is carried out simultaneously with the fourth step and the fifth step by the above-described thermal pressing.

The conditions of the thermal pressing are selected so that the thermosetting components of the first binder 91, the second binder 92, and the third binder 93 can be brought into a C-stage state.

In the sixth step, the first binder 91 in the first magnetic sheet 51, the second binder 92 in the second magnetic sheet 52, and the third binder 93 in the third magnetic sheet 53 are simultaneously brought into a C-stage state by the above-described thermal pressing.

Therefore, the binder 9 contains a cured product of the thermosetting component in a C-stage state (product in a C-stage state).

The first magnetic sheet 51, the second magnetic sheet 52, and the third magnetic sheet 53 are brought into a C-stage state, so that each of the boundary between the first magnetic sheet 51 and the second magnetic sheet 52, and the boundary between the first magnetic sheet 51 and the third magnetic sheet 53 disappears, and one magnetic layer 3 consisting of the first magnetic sheet 51, the second magnetic sheet 52, and the third magnetic sheet 53 (ref: FIG. 1A) is formed. In FIG. 3F, the above-described boundary is described in order to clearly show the arrangement of the first magnetic sheet 51, the second magnetic sheet 52, and the third magnetic sheet 53.

3. Usage

The inductor 1 is one component of an electronic device, that is, a component for fabricating an electronic device, and is an industrially available device whose component alone is circulated without including an electronic element (chip, capacitor, and the like) and a mounting substrate for mounting the electronic element thereon.

The inductor 1 is, for example, loaded on (incorporated into) an electronic device and the like. Although not shown, the electronic device includes a mounting substrate, and an electronic element mounted on the mounting substrate (chip, capacitor, etc.). Then, the inductor 1 is mounted on the mounting substrate through a connecting member such as solder, is electrically connected to another electronic device, and acts as a passive element such as a coil.

Then, according to the inductor 1, since the filling rate of the anisotropic magnetic particles 8 is 40% by volume or more in the peripheral region 4 of the wire 2, the inductance is excellent.

Moreover, since the inductor 1 includes the wire 2 in a generally circular shape in a cross-sectional view, the configuration is simple, and it is possible to easily obtain the inductor 1 including the wire 2.

Therefore, the inductor 1 has excellent inductance, while being easily obtained with a simple configuration.

In the inductor 1, since the anisotropic magnetic particles 8 are orientated in a portion adjacent to the wire 2 in the magnetic layer 3, the inductance is excellent.

Since the peripheral region 4 of the inductor 1 includes the first region 11 in which the anisotropic magnetic particles 8 are orientated along the circumferential direction of the wire 2, the inductance is excellent.

Furthermore, since the peripheral region 4 of the inductor 1 includes the second region 12 in which the anisotropic magnetic particles 8 are not orientated along the circumferential direction of the wire 2, the DC superposition characteristics are excellent.

The total angle ($\alpha 1+\alpha 2$) of the angle $\alpha 1$ of the central angle C of the third region 13 and the angle $\alpha 2$ of the central angle C2 of the fourth region 14 is an obtuse angle, and therefore, the inductance is further more excellent by the anisotropic magnetic particles 8 which are orientated in the circumferential direction in the third region 13 and the fourth region 14 facing each other in the thickness direction.

In the inductor 1, since the binder 9 contains a cured product of a thermosetting component in a B-stage state, the peripheral region 4 having a high filling rate of the anisotropic magnetic particles 8 is easily and conveniently formed by the first magnetic sheet 51, the second magnetic sheet 52, and the third magnetic sheet 53 containing the thermosetting component in a B-stage state, and the cured product of the thermosetting component is formed, so that the mechanical strength is also excellent.

Modified Examples of First Embodiment

In the modified examples, the same reference numerals are provided for members and steps corresponding to each of those in the first embodiment, and their detailed description is omitted. Also, the modified examples can achieve the same function and effect as that of the first embodiment unless otherwise specified. Furthermore, the first embodiment and the modified examples thereof can be appropriately used in combination.

In the first embodiment, the fourth step, the fifth step, and the sixth step are carried out simultaneously. Alternatively, also, the fourth step and the fifth step are carried out, and thereafter, the sixth step may be carried out.

In the first embodiment, the fourth step and the fifth step are carried out simultaneously. Alternatively, the fourth step and the fifth step can be also carried out in order. Specifically, in the modified example, as shown in FIGS. 4A to 6H, the first step, the second step, the fourth step, the third step, the fifth step, and the sixth step are carried out in order.

Figures 4A, 4B, 4C:
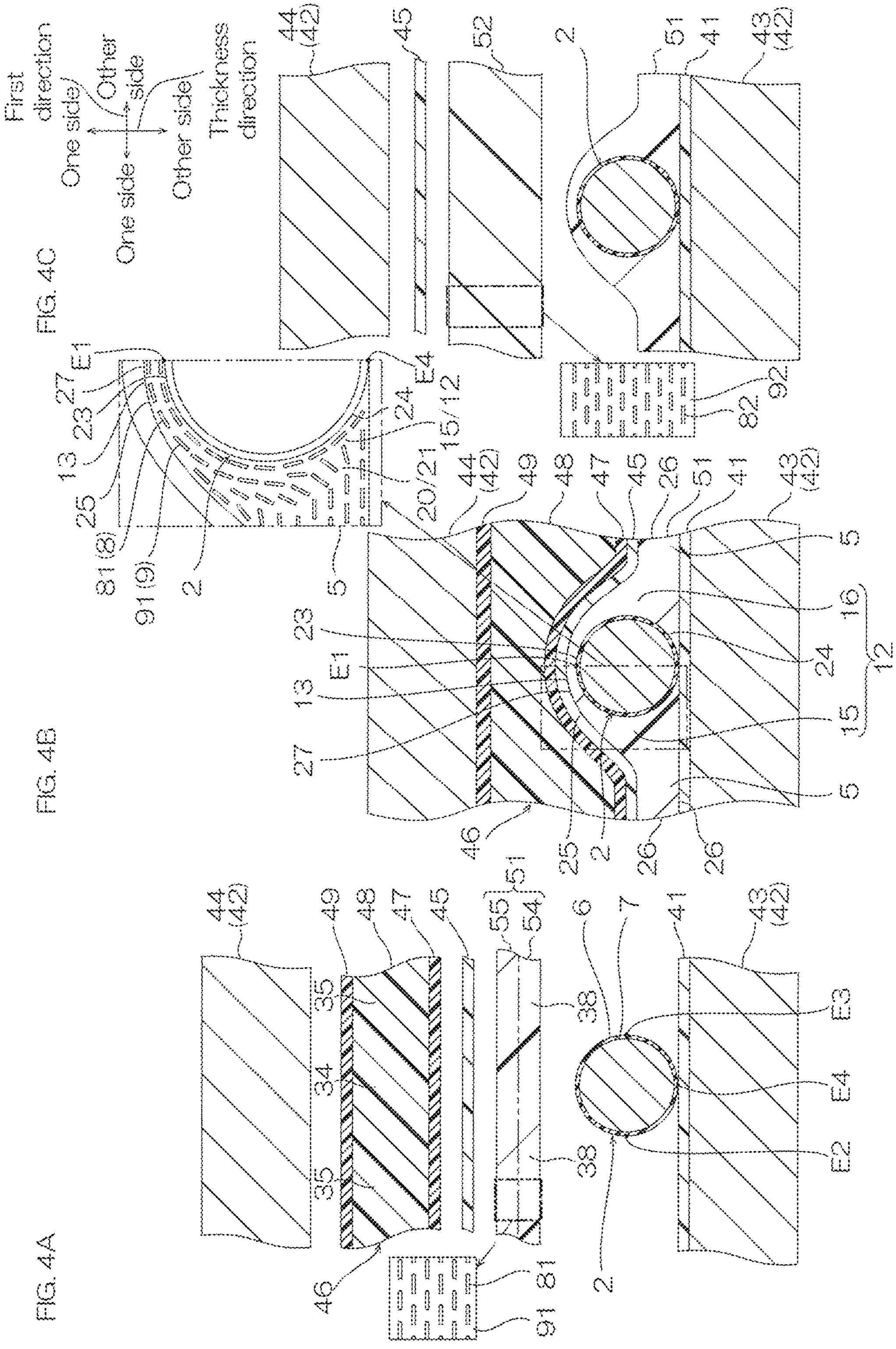
FIGS. 4A to 4C show process views for illustrating a method for producing a modified example of a first embodiment.

As shown in FIG. 4A, in the first step, the wire 2 is disposed on one surface in the thickness direction of the first release sheet 41.

As shown in FIG. 4B, next, in the second step, the first release sheet 41, the wire 2, the first magnetic sheet 51, the second release sheet 45, and the release cushion sheet 46 are sandwiched by the flat plate press 42, and then, the wire 2 and the first magnetic sheet 51 are thermally pressed by the flat plate press 42 through the first release sheet 41, the second release sheet 45, and the release cushion sheet 46. Thus, the first magnetic sheet 51 is disposed on one surface in the thickness direction of the first release sheet 41 so as to cover the superior arc of the circumferential surface of the wire 2.

Figure 5F:
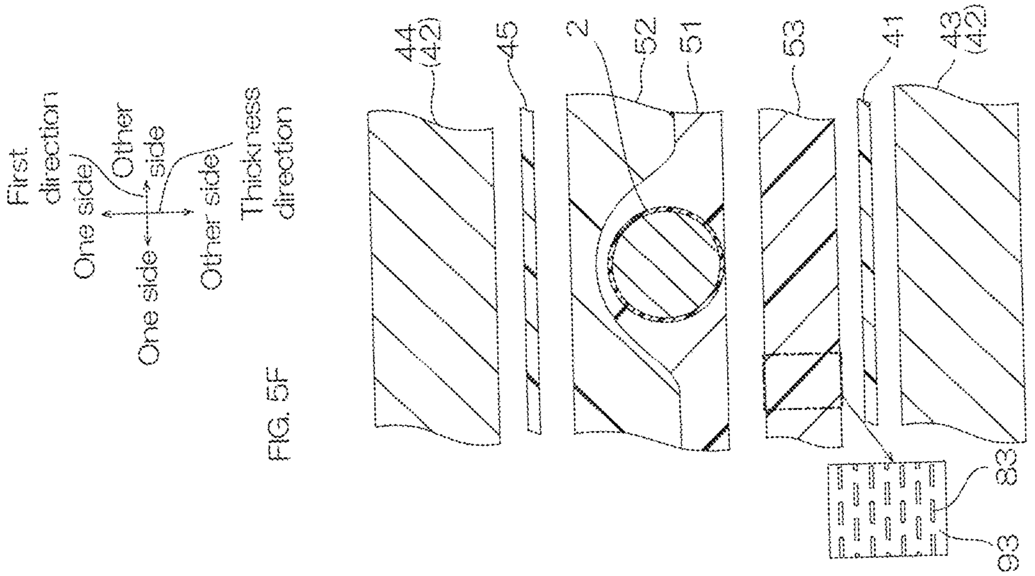
FIGS. 5D to 5F, subsequent to FIG. 4C, show process views for illustrating the method for producing the modified example of the first embodiment.
Figure 5E:
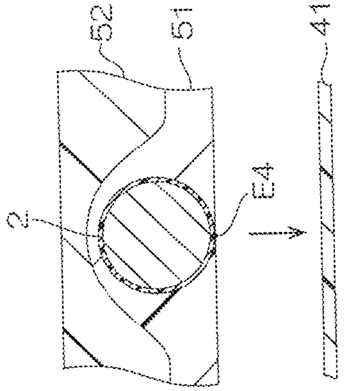
Figure 5D:
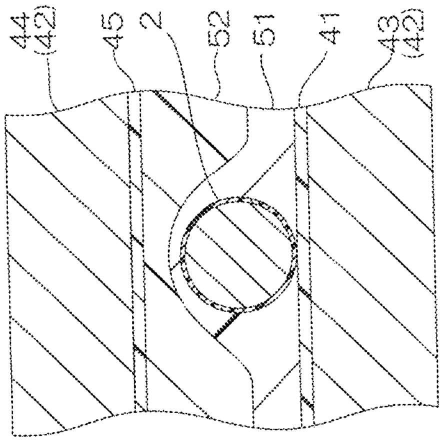

As shown in FIG. 5D, next, the fourth step is carried out. Specifically, first, the pressing of the flat plate press 42 shown in FIG. 4B is released, and subsequently, as shown in FIG. 4C, the second release sheet 45 and the release cushion sheet 46 are taken out from the flat plate press 42, while the first release sheet 41, the wire 2, and the first magnetic sheet 51 are disposed in the flat plate press 42.

In the fourth step, thereafter, separately, the second magnetic sheet 52 and the second release sheet 45 are disposed on one side in the thickness direction of the first magnetic sheet 51.

As shown in FIG. 5D, subsequently, the second magnetic sheet 52 is thermally pressed by using the flat plate press 42. Thus, the second magnetic sheet 52 covers one surface of the first magnetic sheet 51.

Figure 6H:
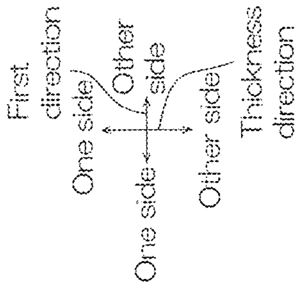
FIGS. 6G to 6H, subsequent to FIG. 5F, show process views for illustrating the method for producing the modified example of the first embodiment.
Figure 6H:
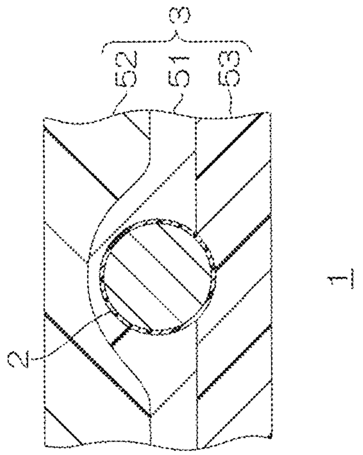
Figure 6G:
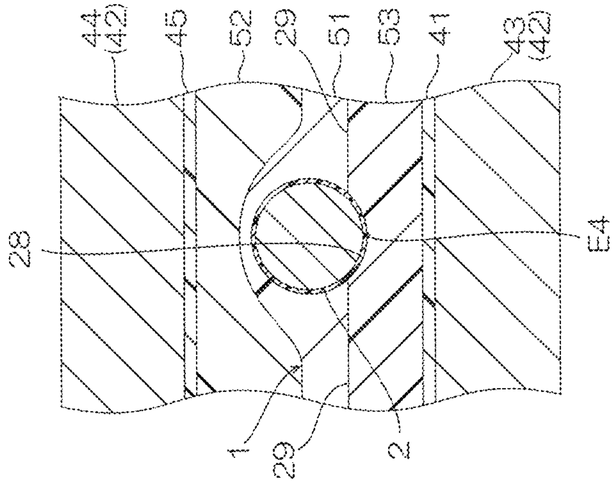

As shown in FIG. 6G, the third step is carried out. Specifically, first, the pressing of the flat plate press 42 shown in FIG. 5D is released, and the first release sheet 41, the wire 2, the first magnetic sheet 51, the second magnetic sheet 52, and the second release sheet 45 are taken out from the flat plate press 42.

In the third step, subsequently, as shown in FIG. 5E, the first release sheet 41 is peeled from the other surface of the first magnetic sheet 51 and the thickness directional other end edge E4 of the wire 2.

As shown in FIG. 5F, next, the fifth step is carried out.

Specifically, in the fifth step, the first release sheet 41, the third magnetic sheet 53, the wire 2, the first magnetic sheet 51, the second magnetic sheet 52, and the second release sheet 45 are disposed in the flat plate press 42.

In the fifth step, as shown in FIG. 6G, the third magnetic sheet 53 is thermally pressed by the flat plate press 42. Thus, the third magnetic sheet 53 is disposed on the other surface of the first magnetic sheet 51 in a B-stage state so as to cover the thickness directional other end edge E4 of the wire 2. At this time, the thickness directional other end edge E4 of the wire 2 is sunk into the opposing portion 28.

After the fifth step, or at the same time as the fifth step, the sixth step is carried out. Specifically, the first magnetic sheet 51, the second magnetic sheet 52, and the third magnetic sheet 53 are brought into a C-stage state to form the magnetic layer 3 in a C-stage state. Thus, the inductor 1 including the wire 2, and the magnetic layer 3 covering the wire 2 is obtained.

As shown in FIG. 6H, then, the inductor 1 is taken out from the flat plate press 42.

Of the modified example and the first embodiment, preferably, the first embodiment is used. In the first embodiment, since the fourth step and the fifth step are carried out simultaneously, it is possible to reduce the number of production steps, and easily produce the inductor 1.

In the second step of the first embodiment, as shown in FIG. 2B, the second release sheet 45 is disposed in the flat plate press 42. Alternatively, it is also possible to carry out the thermal pressing without disposing the second release sheet 45.

In the second magnetic sheet 52, the second anisotropic magnetic particles 82 are orientated in the plane direction. Alternatively, the second anisotropic magnetic particles 82 also may not be orientated in the plane direction.

In the first embodiment, the wire 2 has a generally circular shape in a cross-sectional view. However, the shape in a cross-sectional view is not particularly limited, and though not shown, examples of the shape thereof may include a generally elliptical shape, a generally rectangular (including square and rectangular) shape, and a generally indefinite shape. As an embodiment in which the wire 2 includes a generally rectangular shape, at least one side may be curved, and also at least one corner may be curved.

In any of the description above, the peripheral region 4 is a region traveling outwardly from the outer peripheral surface of the wire 2 by 1.5 times an average ([longest length+shortest length]/2) of the longest length and the shortest length from the center of gravity C of the wire 2 to the outer peripheral surface of the wire 2 in a cross-sectional view.

Second Embodiment

In the second embodiment, the same reference numerals are provided for members and steps corresponding to each of those in the first embodiment and the modified examples thereof, and their detailed description is omitted. Also, the second embodiment can achieve the same function and effect as that of the first embodiment and the modified examples thereof unless otherwise specified. Furthermore, the first embodiment, the second embodiment, and the modified examples thereof can be appropriately used in combination.

In the first embodiment shown in FIGS. 1A to 1B, when projected in the thickness direction, the intersection portion 20 is disposed at one side in the thickness direction of the thickness directional other end edge E4 of the wire 2 at spaced intervals thereto. Alternatively, for example, as shown in FIGS. 7A to 7B, the intersection portion 20 may be overlapped with the thickness directional other end edge E4 of the wire 2.

Figure 7A:
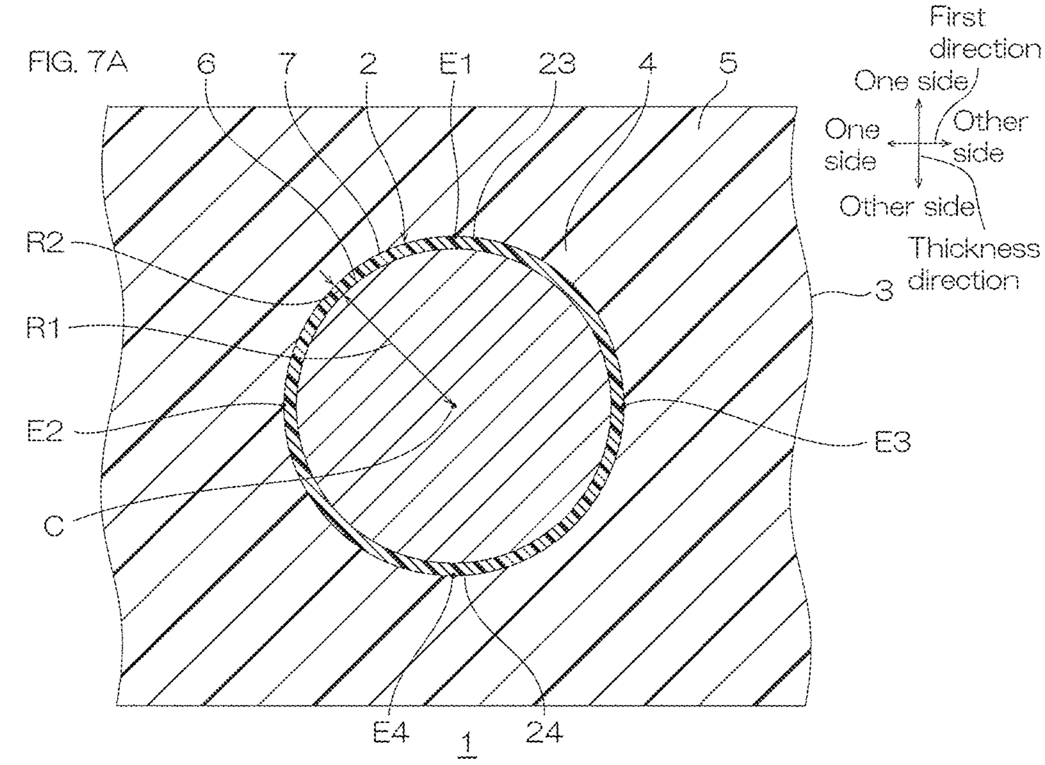
FIGS. 7A to 7B show cross-sectional views of a second embodiment of an inductor of the present invention.
Figure 7B:
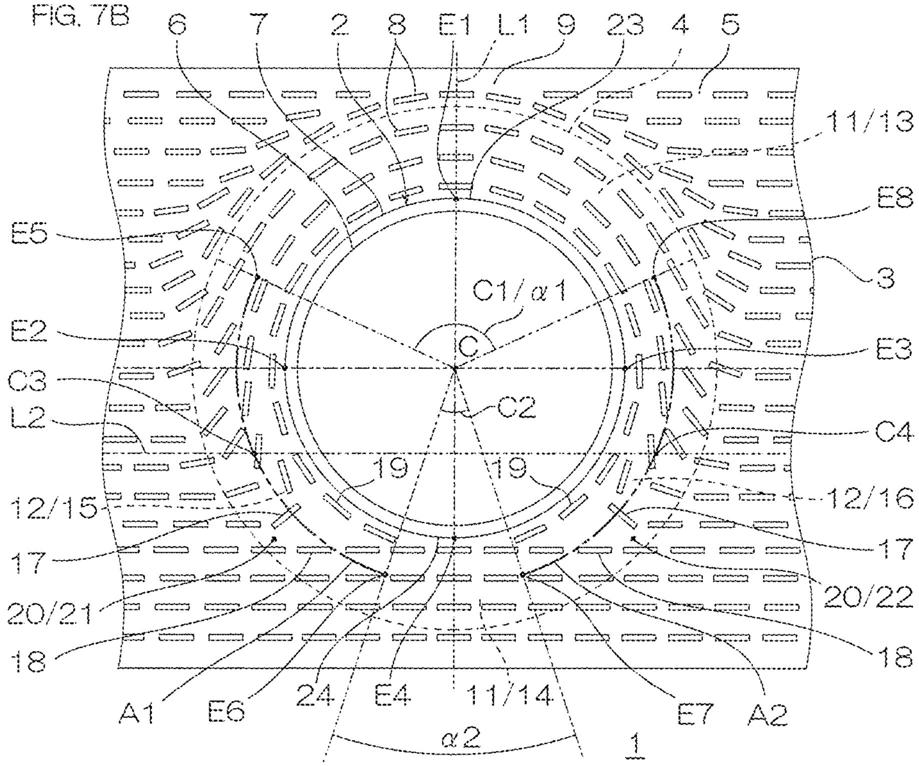

As shown in FIGS. 7A to 7B, the fourth region 14 of the inductor 1 of the second embodiment is narrower than the fourth region 14 of the inductor 1 of the first embodiment. Specifically, the angle $\alpha$2 of the central angle C2 of the fourth region 14 is below 15°, and above 0°.

Next, a method for producing the inductor 1 is described with reference to FIGS. 8A to 10H.

A method for producing the inductor 1 includes a first step to a sixth step. In the method for producing the inductor 1, a first step, a second step, and a third step are carried out in order, and then, a fourth step and a fifth step are carried out simultaneously. Further, a sixth step is carried out dividedly, specifically, is carried out dividedly at the time of the thermal pressing in the second step, and the time of the thermal pressing in the fourth and fifth steps.

(First Step)

Figures 8A, 8B, 8C:
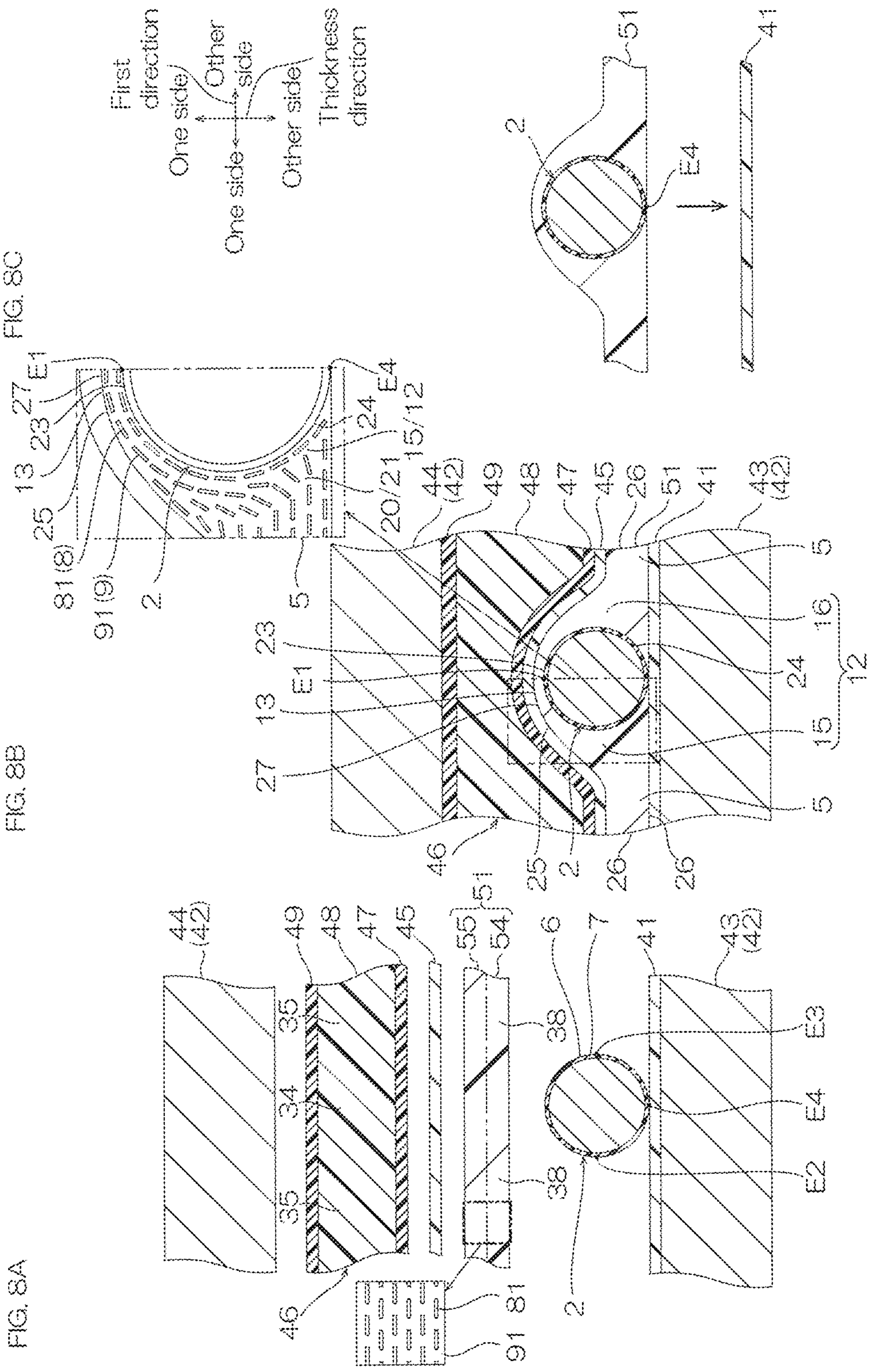
FIGS. 8A to 8C show process views for illustrating a method for producing an inductor of a second embodiment.

As shown in FIG. 8A, in the first step, the wire 2 is disposed on one surface in the thickness direction of the first release sheet 41.

(Second Step and Portion of Sixth Step)

As shown in FIG. 8B, next, the first release sheet 41, the wire 2, the first magnetic sheet 51, the second release sheet 45, and the release cushion sheet 46 are sandwiched in order by the flat plate press 42. Subsequently, the first magnetic sheet 51 is thermally pressed by the flat plate press 42. Thus, the first magnetic sheet 51 is disposed on one surface in the thickness direction of the first release sheet 41 so as to cover the superior arc of the circumferential surface of the wire 2.

After the second step, or at the same time as the second step, the first magnetic sheet 51 is heated by a heat source of the flat plate press 42, and the first magnetic sheet 51 is brought into a C-stage state (practice of a portion of the sixth step).

(Third Step)

In the third step, first, the pressing of the flat plate press 42 shown in FIG. 8B is released, and subsequently, as shown in FIG. 8C, the first release sheet 41, the wire 2, the first magnetic sheet 51, the second release sheet 45, and the release cushion sheet 46 are taken out from the flat plate press 42.

Subsequently, the first release sheet 41 is peeled from the other surface of the first magnetic sheet 51, and the thickness directional other end edge E4 of the wire 2.

Further, the second release sheet 45 and the release cushion sheet 46 are peeled from one surface of the first magnetic sheet 51.

(Fourth Step and Fifth Step, and Rest of Sixth Step)

Figures 9D, 9E, 9F:
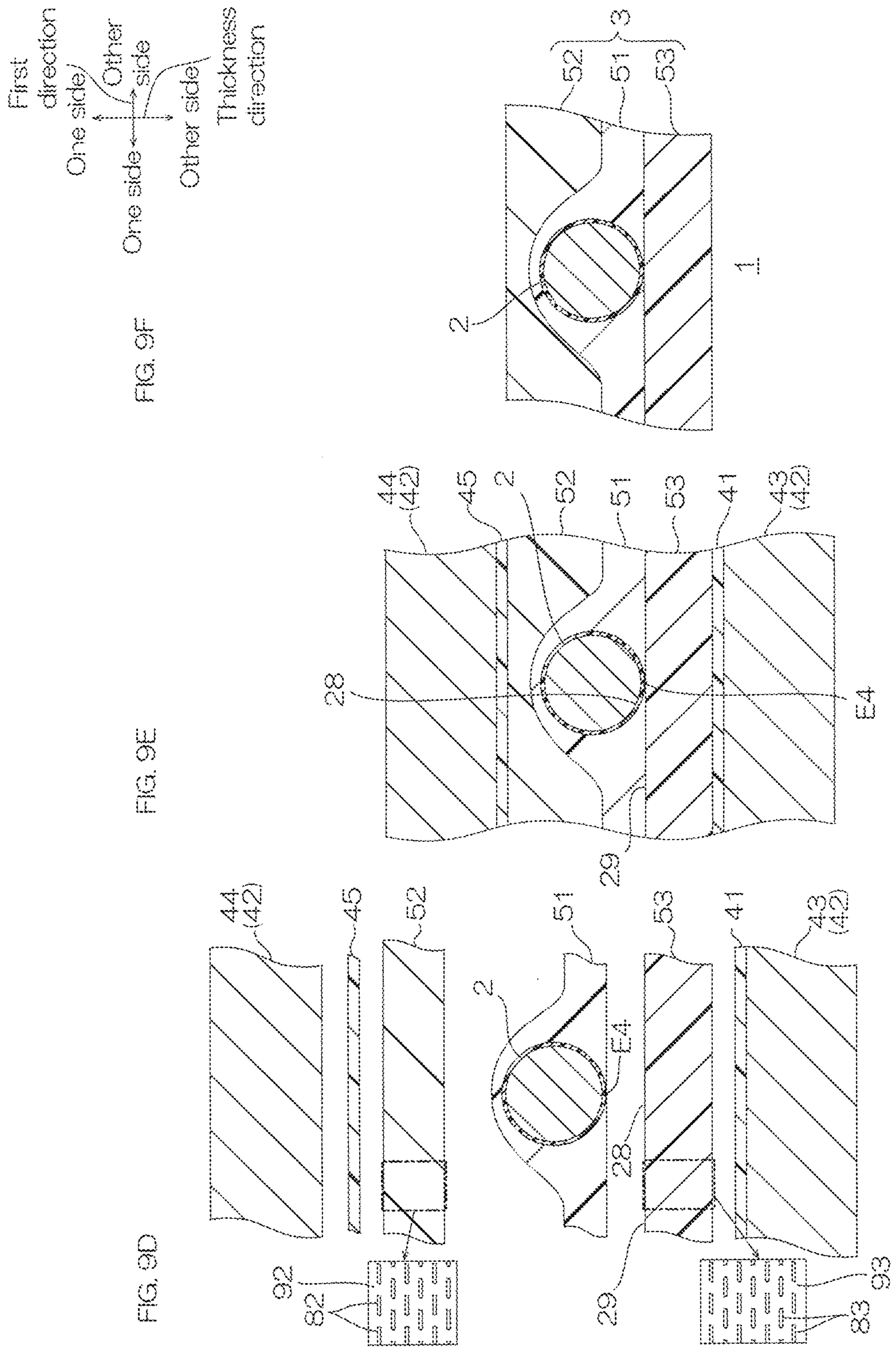
FIGS. 9D to 9F, subsequent to FIG. 8C, show process views for illustrating a method for producing an inductor of a second embodiment.

As shown in FIG. 9E, the fourth step and the fifth step are carried out simultaneously.

As shown in FIG. 9D, in the fourth step and the fifth step, first, the first release sheet 41, the third magnetic sheet 53, the wire 2, the first magnetic sheet 51, the second magnetic sheet 52, and the second release sheet 45 are disposed in the flat plate press 42. Both the second magnetic sheet 52 and the third magnetic sheet 53 are in a B-stage state.

As shown in FIG. 9E, next, the second magnetic sheet 52 and the third magnetic sheet 53 are pressed by the flat plate press 42.

Thus, the second magnetic sheet 52 covers one surface in the thickness direction of the first magnetic sheet 51.

The third magnetic sheet 53 is disposed on the other surface in the thickness direction of the first magnetic sheet 51 so as to cover the thickness directional other end edge E4 of the wire 2. At this time, the movement of the other surface of the relatively hard first magnetic sheet 51 in a C-stage state is suppressed, and also, the sinking of the third magnetic sheet 53 of the thickness directional other end edge E4 of the wire 2 into the opposing portion 28 is suppressed. That is, one surface of the third magnetic sheet 53 can be retained flat.

Thereafter, the second magnetic sheet 52 and the third magnetic sheet 53 are heated by a heat source of the flat plate press 42, and the second magnetic sheet 52 and the third magnetic sheet 53 are brought into a C-stage state (practice of the rest of the sixth step).

Thus, the inductor 1 including the wire 2 and the magnetic layer 3 is obtained.

As shown in FIG. 9F, the inductor 1 is taken out from the flat plate press 42.

Of the first embodiment and the second embodiment, preferably, the first embodiment is used. In the first embodiment, since the thermosetting components in a B-stage state of the first binder 91 and the third binder 93 are simultaneously brought into a C-stage state in the sixth step, the production time can be shortened as compared with the second embodiment in which the thermosetting components in a B-stage state of the first binder 91 and the third binder 93 are brought into a C-stage state in order. Therefore, it is possible to easily produce the inductor 1.

Modified Examples of Second Embodiment

In the modified examples, the same reference numerals are provided for members and steps corresponding to each of those in the second embodiment, and their detailed description is omitted. Also, the modified examples can achieve the same function and effect as that of the second embodiment unless otherwise specified. Furthermore, the second embodiment and the modified examples thereof can be appropriately used in combination.

In the second embodiment, the fourth step, the fifth step, and the rest of the sixth step are carried out simultaneously. Alternatively, the fourth step and the fifth step are carried out, and then, the rest of the sixth step can be also carried out.

In the second embodiment, the fourth step and the fifth step are carried out simultaneously. Alternatively, the fourth step and the fifth step can be also carried out in order.

In the modified example, as shown in FIGS. 10A to 12H, the first step, the second step, the fourth step, the third step, and the fifth step are carried out in order. The sixth step is carried out dividedly.

Figures 10A, 10B, 10C:
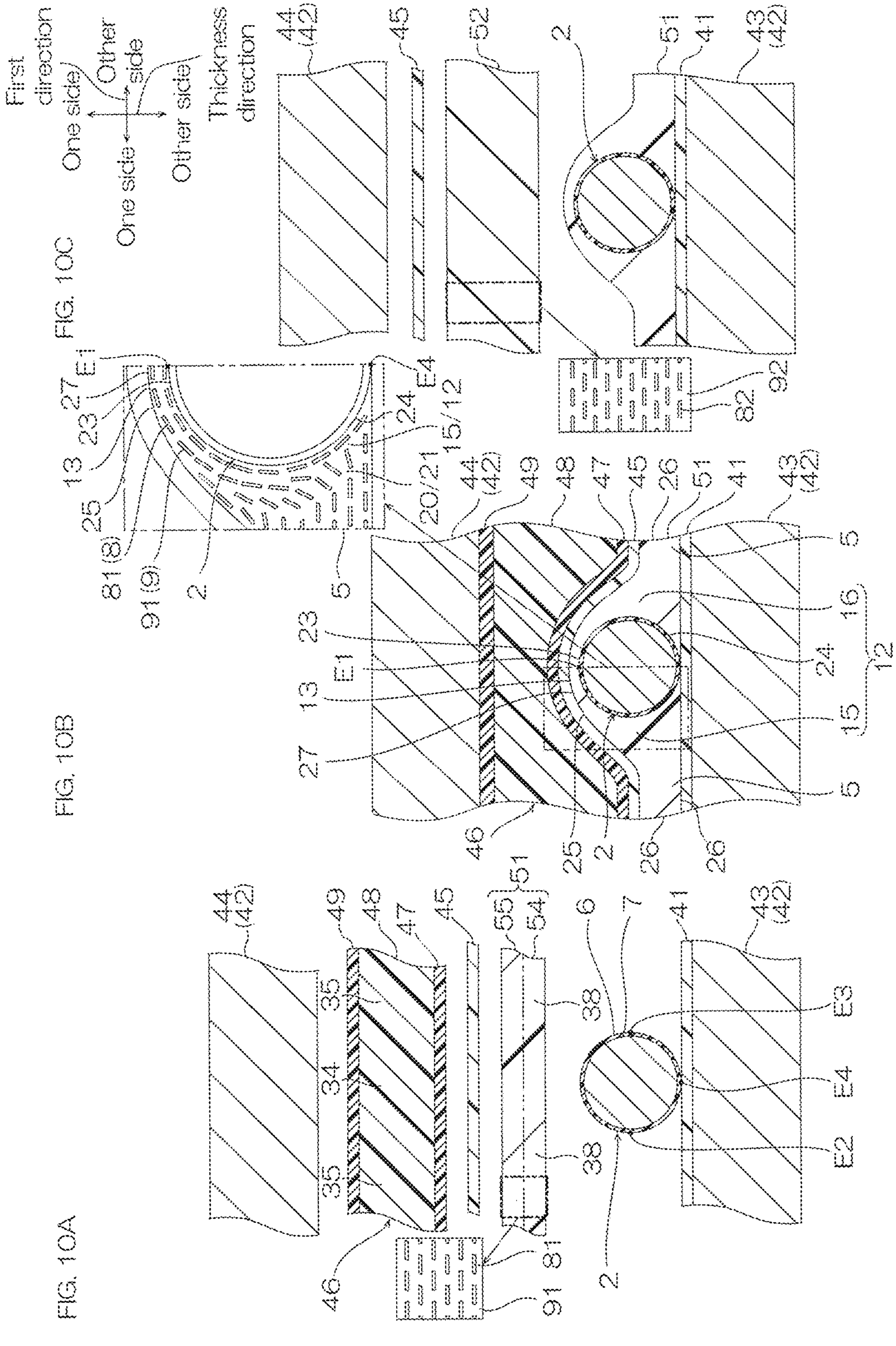
FIGS. 10A to 10C show process views for illustrating a method for producing a modified example of a second embodiment.

As shown in FIG. 10A, in the first step, the wire 2 is disposed on one surface in the thickness direction of the first release sheet 41.

As shown in FIG. 10B, next, the first magnetic sheet 51 is brought into a C-stage state, while the second step is carried out. That is, a portion of the sixth step is carried out. Specifically, the first release sheet 41, the wire 2, the first magnetic sheet 51, the second release sheet 45, and the release cushion sheet 46 are sandwiched in order by the flat plate press 42. Next, the wire 2 and the first magnetic sheet 51 are thermally pressed by the flat plate press 42 through the first release sheet 41, the second release sheet 45, and the release cushion sheet 46. Further, the first magnetic sheet 51 is brought into a C-stage state by a heat source of the flat plate press 42 (practice of a portion of the sixth step).

Figure 11F:
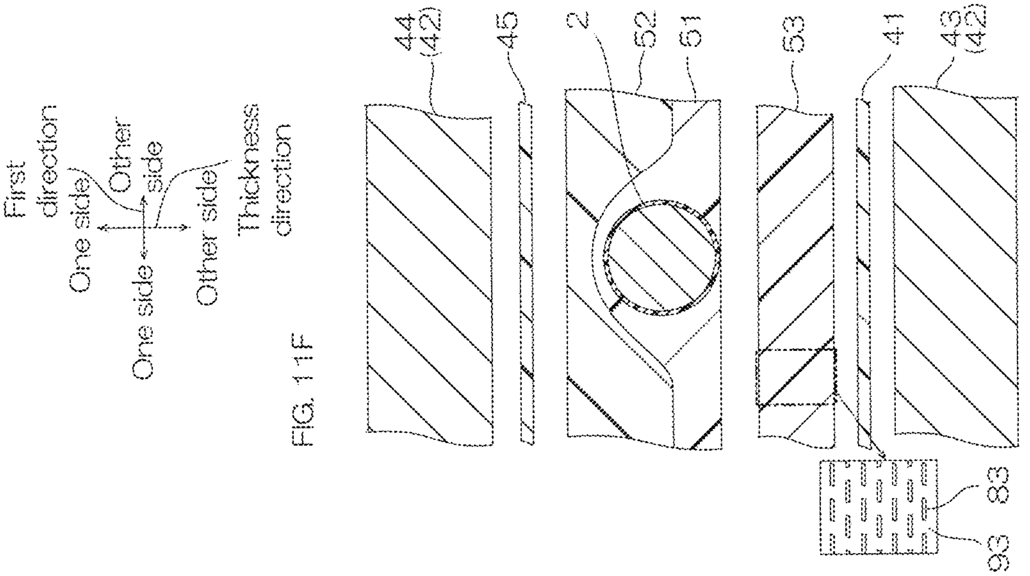
FIGS. 11D to 11F, subsequent to FIG. 10C, show process views for illustrating the method for producing the modified example of the second embodiment.
Figure 11E:
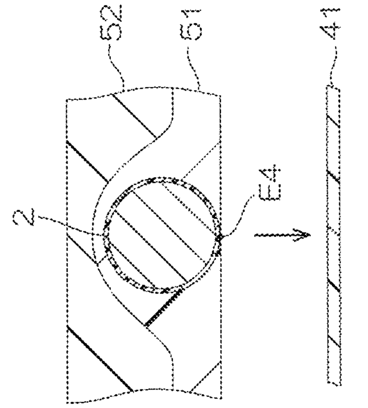
Figure 11D:
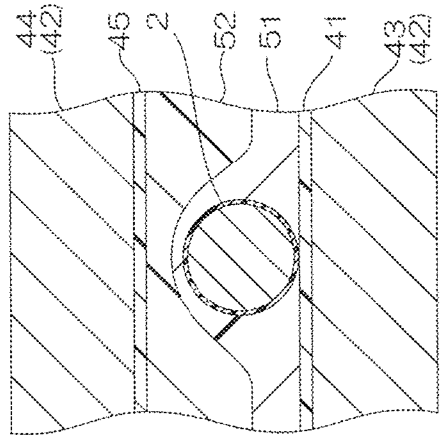

As shown in FIG. 11D, next, the fourth step is carried out. Specifically, first, the pressing of the flat plate press 42 shown in FIG. 10B is released, and subsequently, as shown in FIG. 10C, the second release sheet 45 and the release cushion sheet 46 are taken out from the flat plate press 42, while the first release sheet 41, the wire 2, and the first magnetic sheet 51 are disposed in the flat plate press 42.

In the fourth step, thereafter, separately, the second magnetic sheet 52 and the second release sheet 45 are disposed on one side in the thickness direction of the first magnetic sheet 51.

As shown in FIG. 11D, subsequently, the second magnetic sheet 52 is thermally pressed by using the flat plate press 42. Thus, the second magnetic sheet 52 covers one surface of the first magnetic sheet 51.

As shown in FIG. 11F, next, the third step is carried out.

In the third step, specifically, first, the pressing of the flat plate press 42 shown in FIG. 11D is released, and the first release sheet 41, the wire 2, the first magnetic sheet 51, the second magnetic sheet 52, and the second release sheet 45 are taken out from the flat plate press 42.

In the third step, subsequently, as shown in FIG. 11E, the first release sheet 41 is peeled from the other surface of the first magnetic sheet 51 and the thickness directional other end edge E4 of the wire 2.

As shown in FIG. 12G, next, the fifth step is carried out.

As shown in FIG. 11F, in the fifth step, first, specifically, the first release sheet 41, the third magnetic sheet 53, the wire 2, the first magnetic sheet 51, the second magnetic sheet 52, and the second release sheet 45 are disposed in the flat plate press 42.

In the fifth step, as shown in FIG. 12G, the third magnetic sheet 53 is thermally pressed by the flat plate press 42. Thus, the third magnetic sheet 53 is disposed on the other surface of the first magnetic sheet 51 in a C-stage state so as to cover the thickness directional other end edge E4 of the wire 2.

After the fifth step, or at the same time as the fifth step, the rest of the sixth step is carried out. Specifically, the second magnetic sheet 52 and the third magnetic sheet 53 are brought into a C-stage state by a heat source of the flat plate press 42, and the magnetic layer 3 consisting of the third magnetic sheet 53, the first magnetic sheet 51, and the second magnetic sheet 52 is formed. Thus, the inductor 1 including the wire 2, and the magnetic layer 3 covering the wire 2 is obtained.

As shown in FIG. 12H, then, the inductor 1 is taken out from the flat plate press 42.

Further, in the above-described modified example, along with the second step of disposing the first magnetic sheet 51 in the wire 2 shown in FIG. 10B, the first magnetic sheet 51 is brought into a C-stage state. The time of bringing the first magnetic sheet 51 into a C-stage state is not particularly limited as long as it is before the fifth step (ref: FIG. 12G) of disposing the third magnetic sheet 53 on the other surface of the first magnetic sheet 51. For example, it can be also carried out along with the fourth step of disposing the second magnetic sheet 52 shown in FIG. 11D.

Further, the first magnetic sheet 51 and the second magnetic sheet 52 can be brought into a C-stage state simultaneously. The second magnetic sheet 52 is disposed on one surface of the first magnetic sheet 51 in a B-stage state, and thereafter, the first magnetic sheet 51 and the second magnetic sheet 52 are simultaneously brought into a C-stage state. Also, the second magnetic sheet 52 is brought into a C-stage state, and then, the third magnetic sheet 53 may be disposed on the other surface of the first magnetic sheet 51 to be subsequently brought into a C-stage state.

Further, the third magnetic sheet 53 is disposed on the other surface of the first magnetic sheet 51, and then, the second magnetic sheet 52 may be disposed on one surface of the first magnetic sheet 51. In this case, the third magnetic sheet 53 and the second magnetic sheet 52 may be brought into a C-stage state simultaneously, or the third magnetic sheet 53 may be brought into a C-stage state, and then, the second magnetic sheet 52 may be brought into a C-stage state.

Figures 13A, 13B, 13C:
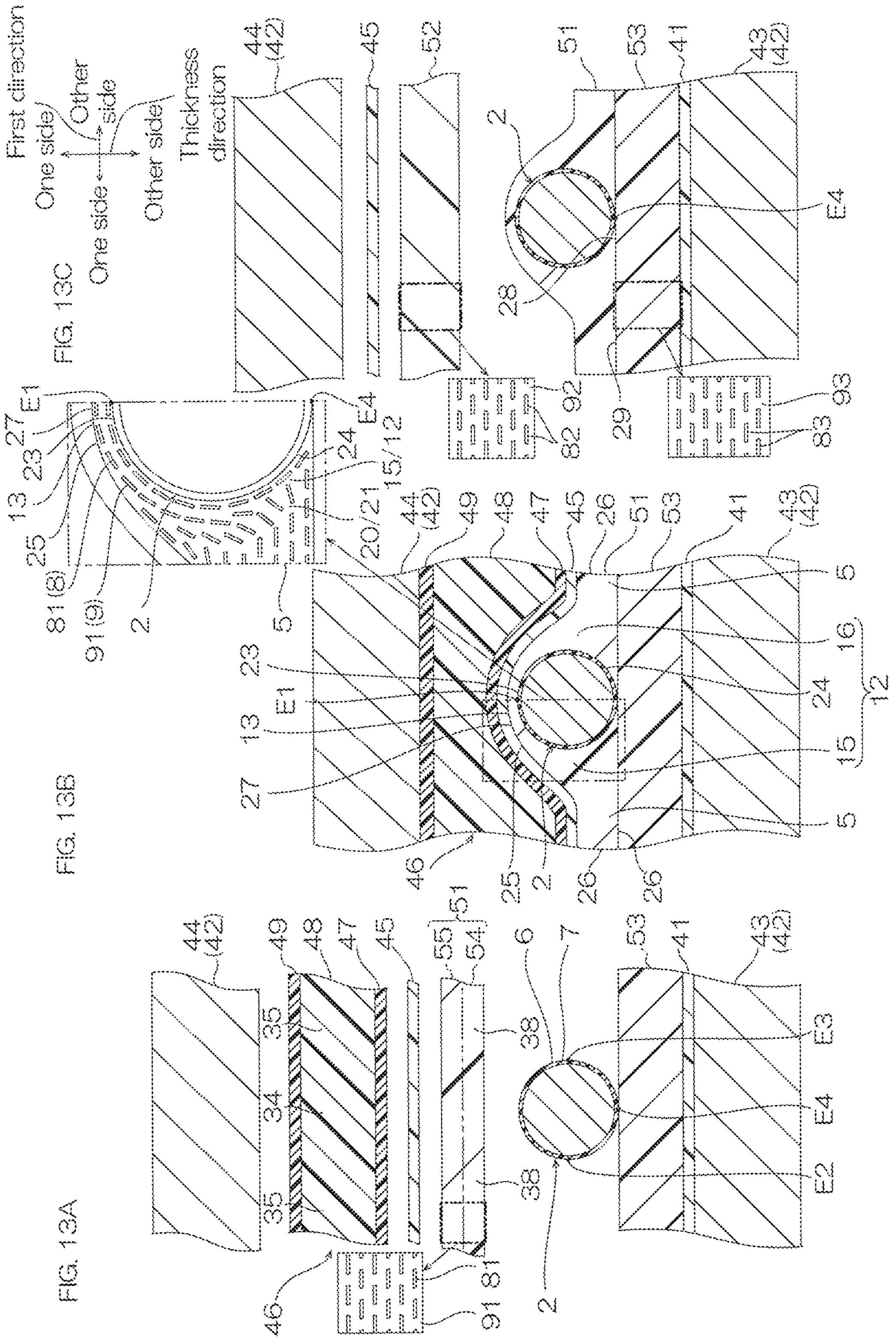
FIGS. 13A to 13C show process views for illustrating a method for producing a further modified example of a second embodiment.

Further, as shown in FIG. 13A, in the first step, the wire 2 may be also disposed on one surface in the thickness direction of the third magnetic sheet 53 in a C-stage state (one example of a substrate) rather than the first release sheet 41.

Specifically, first, the third magnetic sheet 53 in a C-stage state is fabricated, and disposed on one surface in the thickness direction of the first release sheet 41. The third binder 93 in the third magnetic sheet 53 contains a cured product of a thermosetting component in a C-stage state.

Subsequently, the first release sheet 41, the third magnetic sheet 53 in a C-stage state, the wire 2, the first magnetic sheet 51, the second release sheet 45, and the release cushion sheet 46 are sandwiched by the flat plate press 42.

The second step is carried out as shown in FIG. 13B. In the second step, the first release sheet 41, the third magnetic sheet 53, the wire 2, the first magnetic sheet 51, the second release sheet 45, and the release cushion sheet 46 are sandwiched in order by the flat plate press 42.

Subsequently, the third magnetic sheet 53, the wire 2, and the first magnetic sheet 51 are thermally pressed by the flat plate press 42 through the first release sheet 41, the second release sheet 45, and the release cushion sheet 46. Thus, the first magnetic sheet 51 is disposed on one surface in the thickness direction of the third magnetic sheet 53 in a C-stage state so as to cover the superior arc of the circumferential surface of the wire 2.

Then, in the fourth step, first, the pressing of the flat plate press 42 shown in FIG. 13B is released, and subsequently, as shown in FIG. 13C, the second release sheet 45 and the release cushion sheet 46 are taken out from the flat plate press 42, while the first release sheet 41, the third magnetic sheet 53, the wire 2, and the first magnetic sheet 51 are disposed in the flat plate press 42.

Then, in the fourth step, thereafter, separately, the second magnetic sheet 52 and the second release sheet 45 are disposed on one side in the thickness direction of the first magnetic sheet 51. The first release sheet 41, the third magnetic sheet 53, the wire 2, the first magnetic sheet 51, the second magnetic sheet 52, and the second release sheet 45 are sandwiched by the flat plate press 42.

Figure 14E:
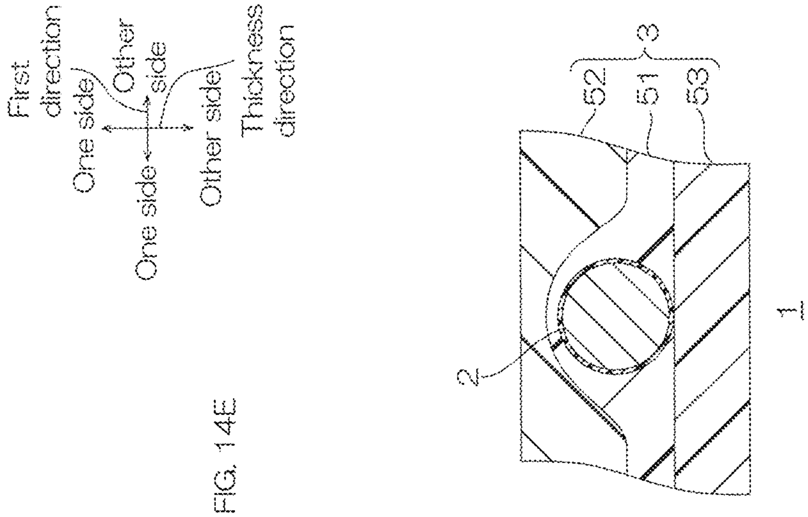
FIGS. 14D to 14E, subsequent to FIG. 13C, show process views for illustrating the method for producing the further modified example of the second embodiment.
Figure 14D:
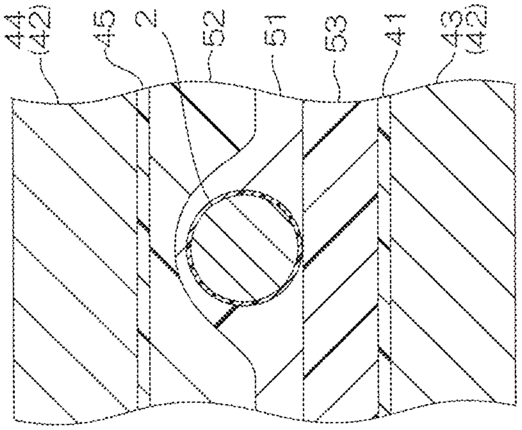

As shown in FIG. 14D, thereafter, the second magnetic sheet 52 is pressed by the flat plate press 42.

Thereafter, the second magnetic sheet 52 and the first magnetic sheet 51 are brought into a C-stage state. Thus, the magnetic layer 3 consisting of the third magnetic sheet 53, the first magnetic sheet 51, and the second magnetic sheet 52 is formed.

As shown in FIG. 14E, thereafter, the inductor 1 is obtained.

In the above-described modified example, the first magnetic sheet 51 and the second magnetic sheet 52 are brought into a C-stage state simultaneously. Alternatively, for example, after bringing the first magnetic sheet 51 into a C-stage state, the second magnetic sheet 52 may be also brought into a C-stage state.

Other Modified Examples

In the modified examples, the same reference numerals are provided for members and steps corresponding to each of those in the first and second embodiments, and their detailed description is omitted. Also, the modified examples can achieve the same function and effect as that of the first and second embodiments unless otherwise specified. Furthermore, the first and second embodiments and the modified examples thereof can be appropriately used in combination.

Figure 15:
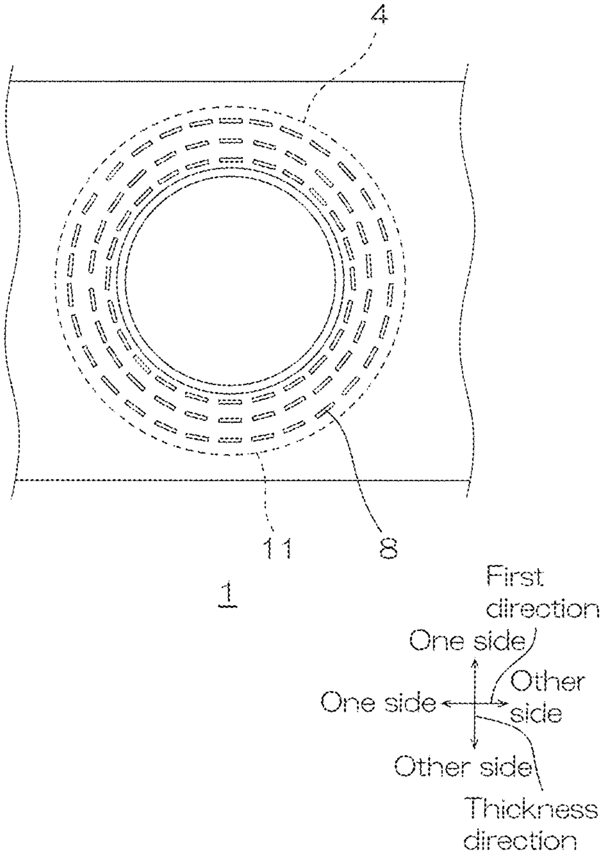
FIG. 15 shows a cross-sectional view of a modified example (embodiment in which a magnetic layer does not include a second region) of an inductor.

As shown in FIG. 15, the peripheral region 4 may also include only the first region 11 without including the second region 12. In FIG. 15, the anisotropic magnetic particles 8 in the outer-side region 5 are omitted in order to clearly show the orientation of the anisotropic magnetic particles 8 in the peripheral region 4.

Figure 16A:
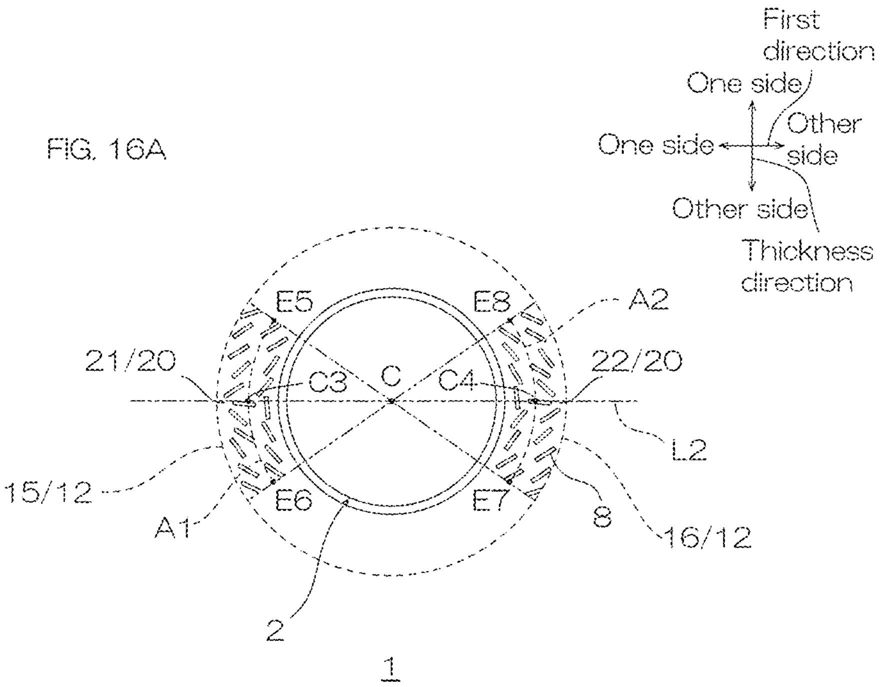
FIGS. 16A to 16B show cross-sectional views of a modified example (embodiment in which the center of a wire is present on a second phantom line) of an inductor.
Figure 16B:
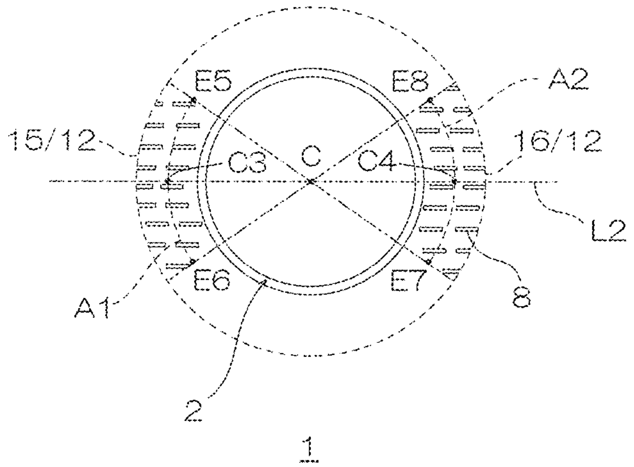

As shown in FIGS. 16A to 16B, the center C of the wire 2 may be also present on the second phantom line L2 connecting the center C3 of the first phantom circular arc A1 in the fifth region 15 to the center C4 of the second phantom circular arc A2 in the sixth region 16. In FIGS. 16A to 16B, the drawing of the outer-side region 5 is omitted in order to clearly show the orientation of the anisotropic magnetic particles 8 in the peripheral region 4.

In the inductor 1 of FIG. 16A, the intersection portion 20 (the first intersection portion 21 and the second intersection portion 22) in the fifth region 15 and the sixth region 16 is overlapped with the center C of the wire 2 when projected in the first direction.

In the inductor 1 of FIG. 16B, the anisotropic magnetic particles 8 are orientated along the first direction in the second region 12. Therefore, there is no intersection portion 20 in the second region 12.

Figure 17:
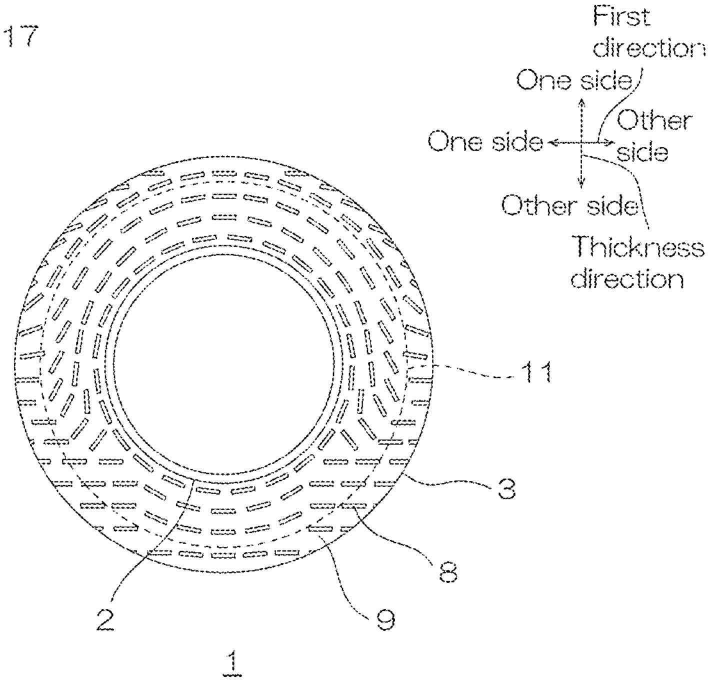
FIG. 17 shows a cross-sectional view of a modified example (embodiment in which a magnetic layer has a generally circular ring shape in a cross-sectional view) of an inductor.

As shown in FIG. 17, the magnetic layer 3 may also have a generally circular ring shape in a cross-sectional view rather than a sheet shape.

In the first embodiment and the second embodiment, the anisotropic magnetic particles 8 are used as one example of magnetic particles. Alternatively, for example, the magnetic particles do not have anisotropy, and may have, for example, an embodiment having isotropy. An example of the shape of the isotropic magnetic particles includes a generally spherical shape. Examples of the isotropic magnetic particles having a generally spherical shape include iron particles having a generally spherical shape. The magnetic particles may also contain both anisotropic magnetic particles and isotropic magnetic particles. An average particle size of the isotropic magnetic particle is, for example, 0.1 μm or more, preferably 0.5 μm or more, and for example, 200 μm or less, preferably 150 μm or less.

Further, in the first embodiment and the second embodiment, the first anisotropic magnetic particles 81 are used as one example of the first magnetic particles. Alternatively, for example, the first magnetic particles do not have anisotropy, and may have, for example, isotropy. An example of the shape of the first isotropic magnetic particles includes a generally spherical shape. Examples of the first isotropic magnetic particles having a generally spherical shape include iron particles having a generally spherical shape.

Further, as shown in FIG. 2A of the first embodiment, FIG. 4A of the modified example thereof, FIG. 8A of the second embodiment, and FIGS. 10A and 13A of the modified example thereof, the first anisotropic magnetic particles 81 are orientated in the plane direction in the first magnetic sheet 51, and the case is not limited to this. They may not be orientated along the plane direction in the first magnetic sheet 51.

In the first embodiment and the second embodiment, the third anisotropic magnetic particles 83 are used as one example of the third magnetic particles. Alternatively, for example, the third magnetic particles may also have isotropy without having anisotropy. An example of the shape of the third isotropic magnetic particles includes a generally spherical shape. Examples of the third isotropic magnetic particles having a generally spherical shape include iron particles having a generally spherical shape.

Further, as shown in FIG. 3D of the first embodiment, FIG. 5F of the modified example thereof, FIG. 9D of the second embodiment, and FIGS. 11F and 13C of the modified example thereof, the third anisotropic magnetic particles 83 are orientated in the plane direction in the third magnetic sheet 53, and the case is not limited to this. They may not be orientated along the plane direction in the third magnetic sheet 53.

As shown in FIGS. 1B and 7B, in the first embodiment and the second embodiment, the anisotropic magnetic particles 8 are orientated at least along the circumferential direction of the wire 2 in the first region 11, and the case is not limited to this. An embodiment in which the anisotropic magnetic particles 8 are not orientated along the circumferential direction of the wire 2 is also included.

A ratio (filling rate) of the magnetic particles (the first magnetic particles, the second anisotropic magnetic particles 82, and the third magnetic particles) in the magnetic layer 3 is not limited to the description above. Alternatively, for example, it may be higher or lower as they move away from the wire 2. To produce the inductor 1 having a higher ratio of the magnetic particles in the magnetic layer 3 as they move away from the wire 2, for example, a presence ratio of the second anisotropic magnetic particles 82 in the second magnetic sheet 52 is set higher than the presence ratio of the magnetic particles in the first magnetic sheet 51.

EXAMPLES

Next, the present invention is further described based on Examples and Comparative Examples below. The present invention is however not limited by these Examples and Comparative Examples. The specific numerical values in mixing ratio (content ratio), property value, and parameter used in the following description can be replaced with upper limit values (numerical values defined as “or less” or “below”) or lower limit values (numerical values defined as “or more” or “above”) of corresponding numerical values in mixing ratio (content ratio), property value, and parameter described in the above-described “DESCRIPTION OF EMBODIMENTS”.

Example 1

<Production Example of Inductor Based on First Embodiment>

In Example 1, the inductor 1 was produced based on the first embodiment. Specifically, as shown in FIGS. 2A to 3F, the first step, the second step, and the third step were carried out in order, and next, the fourth step, the fifth step, and the sixth step were carried out simultaneously.

(First Step)

The wire 2 and the first release sheet 41 were prepared. Specifically, the wire 2 having the radius R of 110 μm was prepared. The radius R1 of the conducting line 6 was 100 μm, and the thickness R2 of the insulating layer 7 was 10 μm.

Separately, the first release sheet 41 made of PET having a thickness of 50 μm was prepared.

As shown in FIG. 2A, subsequently, the wire 2 was disposed on one surface in the thickness direction of the first release sheet 41.

(Second Step)

The first magnetic sheet 51, the second release sheet 45, and the release cushion sheet 46 were prepared.

Specifically, the first magnetic sheet 51 consisting of a laminated sheet of the inner-side sheet 54 having a ratio of the anisotropic magnetic particles 8 of 50% by volume and the outer-side sheet 55 having a ratio of the anisotropic magnetic particles 8 of 60% by volume was prepared as a sheet in a B-stage state. The formulation of the inner-side sheet 54 and the outer-side sheet 55 is as described in Table 1.

Further, as the second release sheet 45, a release film (manufactured by Mitsui Chemicals Tohcello, Inc.) made of TPX (registered trademark) was prepared.

Further, the release cushion sheet 46 obtained by laminating two release films OT-A110 (manufactured by SEKISUI CHEMICAL CO., LTD.) was prepared.

A thickness (total thickness of the release film OT-A110) of the release cushion sheet 46 was 110 μm, and it consisted of the first layer 47 having a thickness of 15 μm, the second layer 48 having a thickness of 80 μm, and the third layer 49 having a thickness of 15 μm. The first layer 47 and the third layer 49 had a tensile storage elastic modulus E' at 110° C. of 190 MPa, and the material thereof contained a polybutylene terephthalate as a main component. The second layer 48 had a tensile storage elastic modulus E' at 110° C. of 5.6 MPa, and the material thereof contained an ethylene-methyl methacrylate copolymer as a main component.

Then, the first release sheet 41, the wire 2, the first magnetic sheet 51, the second release sheet 45, and the release cushion sheet 46 were sandwiched in order by the flat plate press 42.

As shown in FIG. 2B, subsequently, the wire 2 and the first magnetic sheet 51 were thermally pressed by the flat plate press 42 under the pressing conditions of a pressing pressure of 2 MPa, 110° C., and 60 seconds.

Figure 18A:
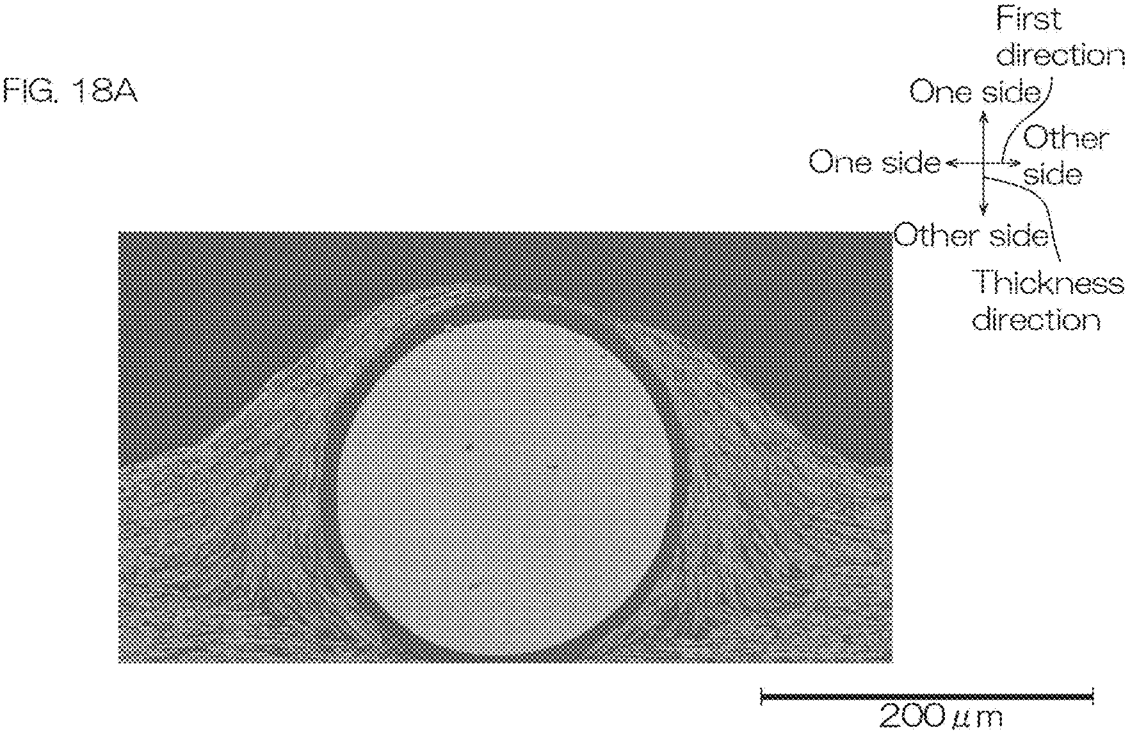
FIGS. 18A to 18B show image process views of an SEM image of Example 1.

An SEM image of a cross section of the wire 2 and the first magnetic sheet 51 after the second step is shown in FIG. 18A.

(Third Step)

In the third step, first, the pressing of the flat plate press 42 shown in FIG. 2B was released, and subsequently, as shown in FIG. 2C, the first release sheet 41, the wire 2, the first magnetic sheet 51, the second release sheet 45, and the release cushion sheet 46 were taken out from the flat plate press 42. Subsequently, the first release sheet 41 was peeled from the other surface of the first magnetic sheet 51, and the thickness directional other end edge E4 of the wire 2. Further, the second release sheet 45 and the release cushion sheet 46 were peeled from one surface of the first magnetic sheet 51.

(Fourth Step, Fifth Step and Sixth Step)

The second magnetic sheet 52 and the third magnetic sheet 53 were prepared.

Specifically, five sheets of the same formulation (ratio of the anisotropic magnetic particles 8 of 60% by volume) as the outer-side sheet 55 in the first magnetic sheet 51 were prepared, and the second magnetic sheet 52 consisting of a laminated sheet of these was prepared as a sheet in a B-stage state.

Further, four sheets of the same formulation (ratio of the anisotropic magnetic particles 8 of 60% by volume) as the outer-side sheet 55 in the first magnetic sheet 51 and one sheet of the same formulation (ratio of the anisotropic magnetic particles 8 of 50% by volume) as the inner-side sheet 54 in the first magnetic sheet 51 were laminated to be prepared, and the third magnetic sheet 53 consisting of a laminated sheet of these was prepared as a sheet in a B-stage state.

As shown in FIG. 3D, then, the first release sheet 41, the third magnetic sheet 53, the wire 2, the first magnetic sheet 51, the second magnetic sheet 52, and the second release sheet 45 (PET film) were disposed in order toward one side in the thickness direction between the first plate 43 and the second plate 44.

As shown in FIG. 3E, subsequently, the third magnetic sheet 53, the wire 2, the first magnetic sheet 51, and the second magnetic sheet 52 were thermally pressed by the flat plate press 42 under the pressing conditions of a pressing pressure of 2 MPa, 170° C., and 900 seconds. Thus, the thermosetting components in the first binder 91, the second binder 92, and the third binder 93 were brought into a C-stage state.

Thus, the circumferential surface of the wire 2 was covered with the magnetic layer 3 consisting of the first magnetic sheet 51, the second magnetic sheet 52, and the third magnetic sheet 53 in a C-stage state, and the inductor 1 shown in FIGS. 1A to 1B was produced.

As shown in FIG. 3F, thereafter, the inductor 1 was taken out from the flat plate press 42.

Figure 18B:
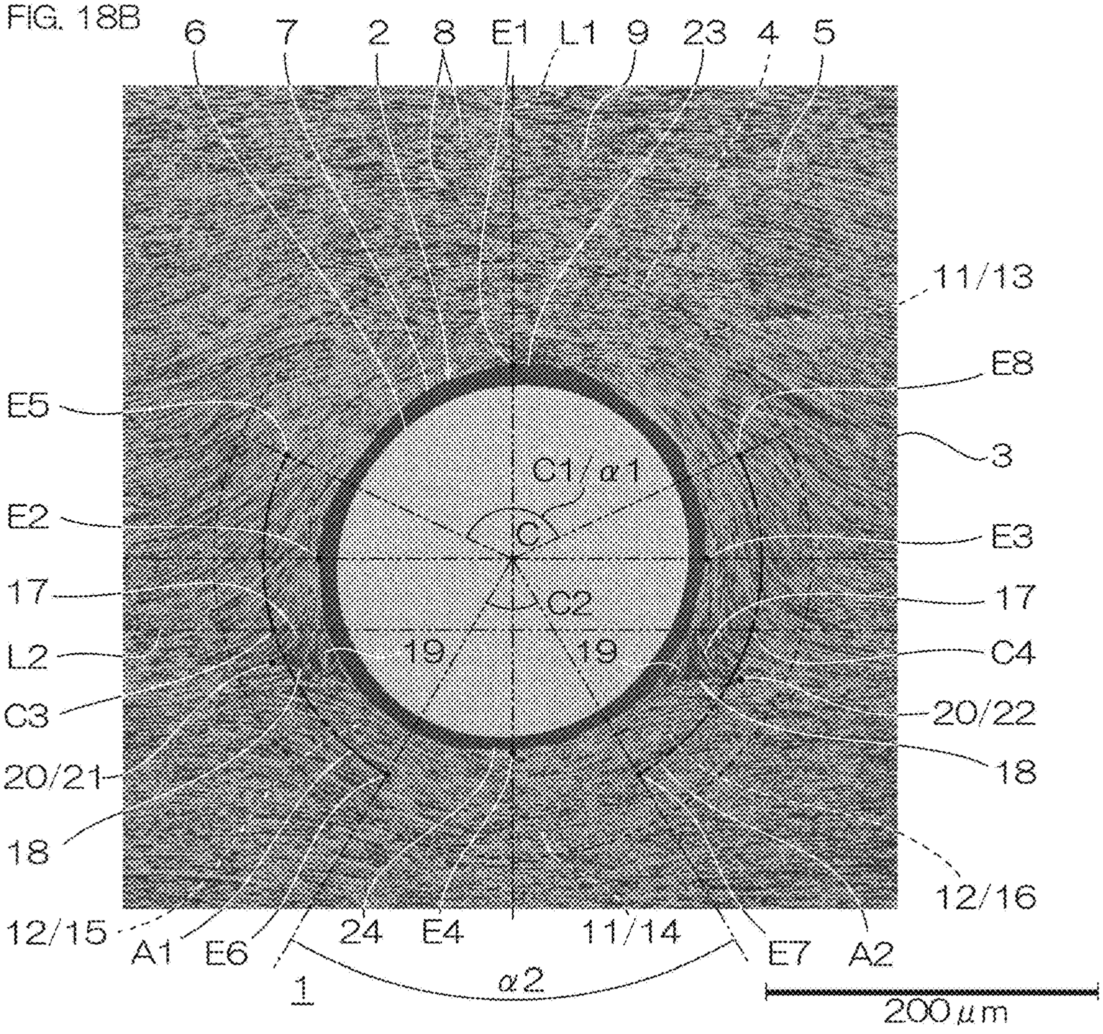

An SEM image of a cross section of the inductor 1 is shown in FIG. 18B.

Example 2

<Production Example of Inductor Based on Modified Example of First Embodiment>

In Example 2, the inductor 1 was produced based on the modified examples of the first embodiment shown in FIGS. 4A to 6H. Specifically, the process was carried out in the same manner as in Example 1, except that the first step, the second step, the fourth step, the third step, the fifth step, and the sixth step were carried out in order.

Figure 19:
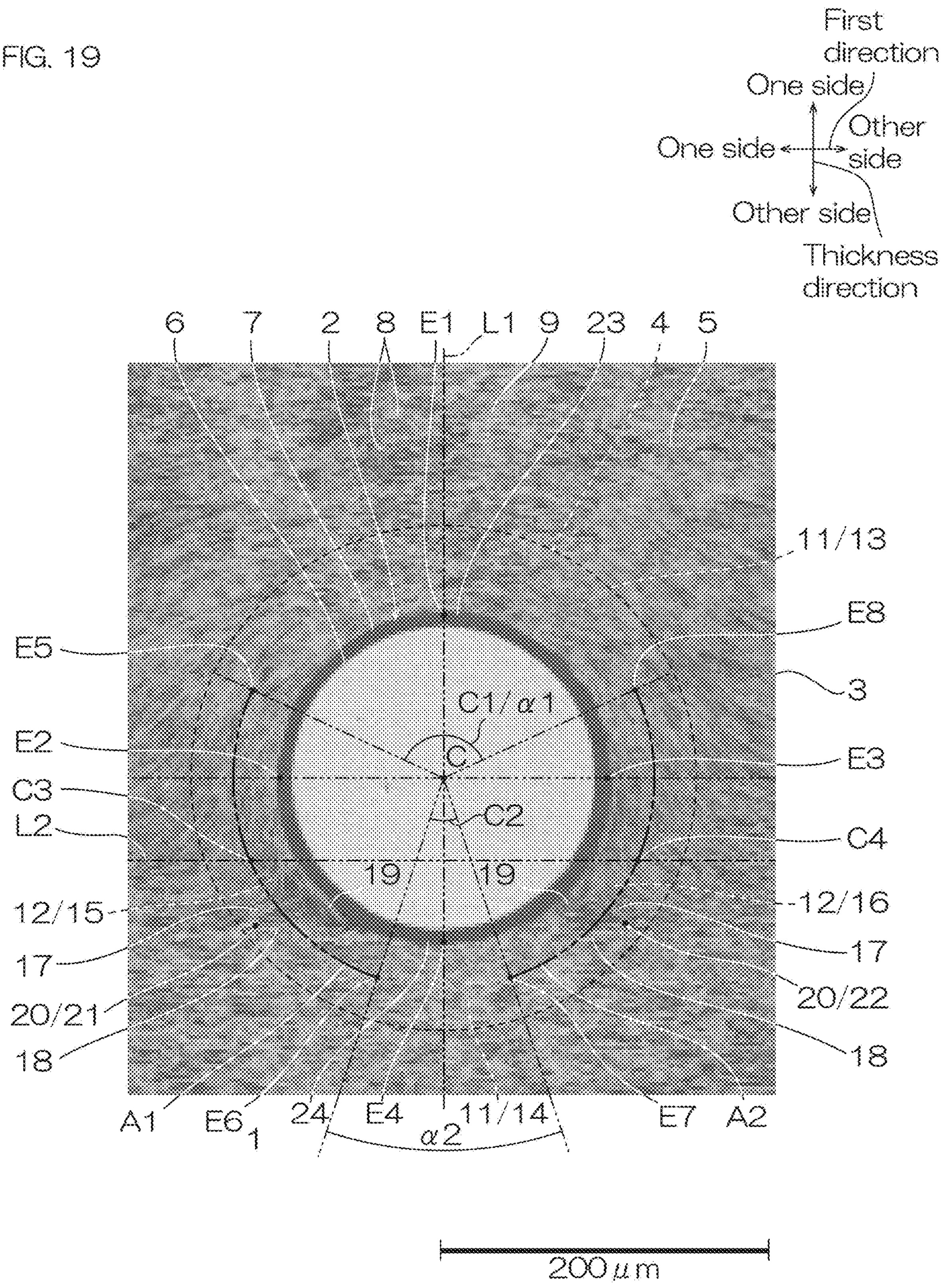
FIG. 19 shows an image process view of an SEM image of an inductor of Example 2.

The inductor 1 is as shown in FIGS. 7A to 7B, and an SEM image of a cross section thereof is shown in FIG. 19.

Examples 3 to 5

The inductor 1 was produced in the same manner as in Example 1, except that the formulation of the first magnetic sheet 51 was changed in accordance with Table 1.

Comparative Example 1

The first release sheet 41 made of PET having a thickness of 50 μm, the third magnetic sheet 53 in a C-stage state, the first adhesive layer in a B-stage state, the same wire 2 as in Example 1, the second adhesive layer in a B-stage state, the second magnetic sheet 52 in a C-stage state, the second release sheet 45 made of TPX, and the release cushion sheet 46 obtained by laminating two release films OT-A110 (manufactured by SEKISUI CHEMICAL CO., LTD.) were disposed in order on one side in the thickness direction of the first plate 43, and a laminate consisting of these was sandwiched between the first plate 43 and the second plate 44.

Both the first adhesive layer and the second adhesive layer were a sheet in a B-stage state made of a thermosetting resin without containing the anisotropic magnetic particles 8. A thickness of each of the first adhesive layer and the second adhesive layer was 2 μm.

The formulation of the second magnetic sheet 52 in a C-stage state and the third magnetic sheet 53 in a C-stage state were as described in Table 1, and both were a cured product which was completely cured.

Then, the above-described laminate was thermally pressed by the flat plate press 42 under the pressing conditions of a pressing pressure of 2 MPa, 170° C., and 900 seconds, and the inductor 1 was produced.

Figure 20:
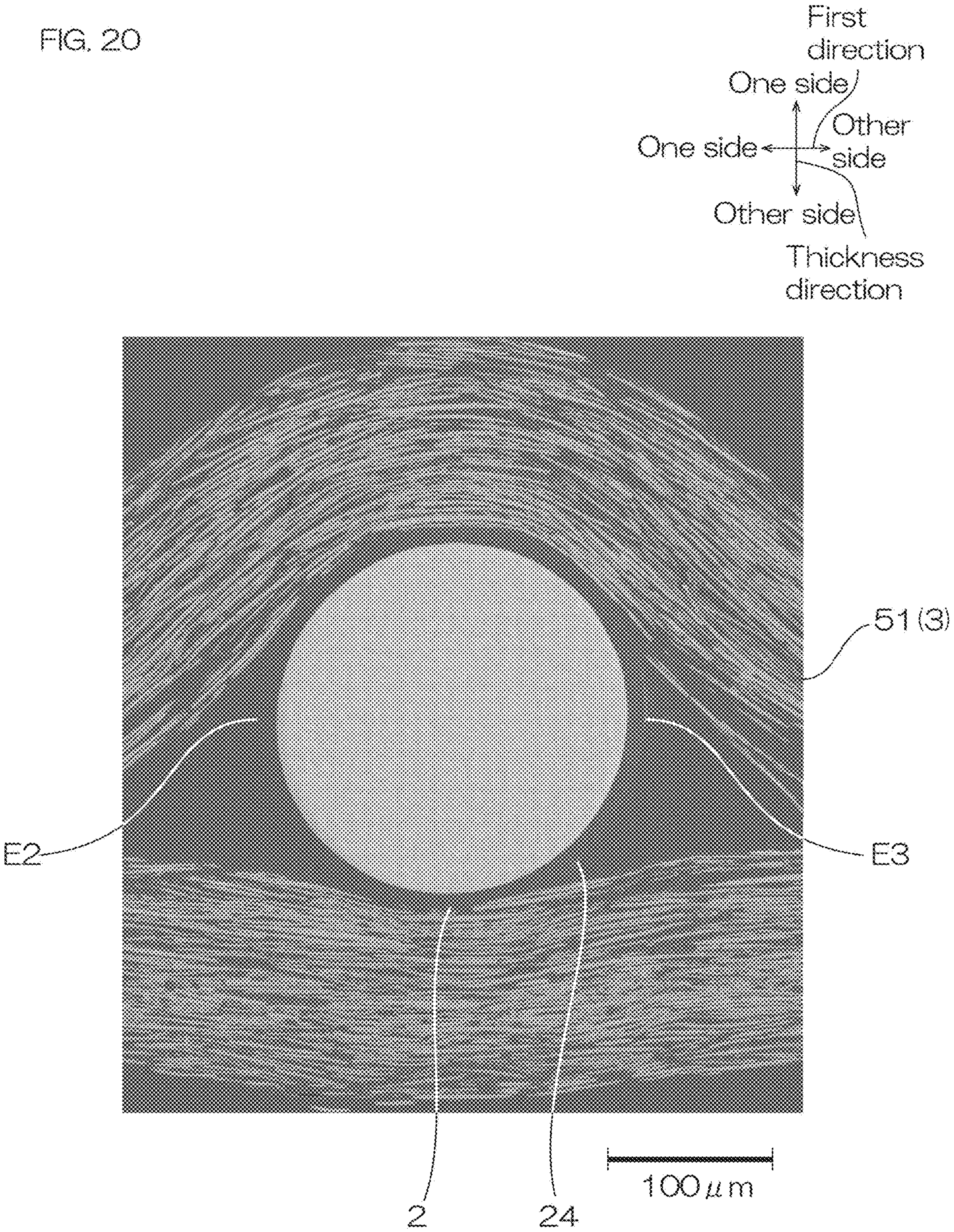
FIG. 20 shows an image process view of an SEM image of an inductor of Comparative Example 1.

An SEM image of a cross section of the inductor 1 of Comparative Example 1 is shown in FIG. 20.

As shown in FIG. 20, a void was formed between the second circular arc surface 24 of the wire 2 and both end edges E2 and E3 in the first direction, and the first magnetic sheet 51 (the magnetic layer 3).

Comparative Example 2

The first release sheet 41 made of PET having a thickness of 50 μm, the third magnetic sheet 53 in a C-stage state, a first pressure-sensitive adhesive layer, the same wire 2 as in Example 1, a second pressure-sensitive adhesive layer, the second magnetic sheet 52 in a C-stage state, the second release sheet 45 made of TPX, and the release cushion sheet 46 obtained by laminating two release films OT-A110 (manufactured by SEKISUI CHEMICAL CO., LTD.) were disposed in order on one side in the thickness direction of the first plate 43, and a laminate consisting of these was sandwiched between the first plate 43 and the second plate 44.

Both the first pressure-sensitive adhesive layer and the second pressure-sensitive adhesive layer were a pressure-sensitive adhesive tape (pressure-sensitively adhesive tape) made of an acrylic pressure-sensitive adhesive (pressure-sensitively adhesive) without containing the anisotropic magnetic particles 8. A thickness of each of the first pressure-sensitive adhesive layer and the second pressure-sensitive adhesive layer was 5 μm.

The formulation of the second magnetic sheet 52 in a C-stage state and the third magnetic sheet 53 in a C-stage state were as described in Table 1, and both were a cured product which was completely cured.

Then, the above-described laminate was thermally pressed by the flat plate press 42 under the pressing conditions of a pressing pressure of 2 MPa, 110° C., and 60 seconds, and the inductor 1 was produced.

A void was formed between the second circular arc surface 24 of the wire 2 and the first directional both end edges E2 and E3, and the first magnetic sheet 51 (the magnetic layer 3).

<Filling Rate>

A filling rate of the anisotropic magnetic particles 8 in the peripheral region 4 of the inductor 1 was calculated in accordance with the binarization of a cross-sectional view of the SEM image. Specifically, in the SEM image, the white was identified as the anisotropic magnetic particles 8, the black was identified as the binder 9, and the filling rate (presence ratio) of the anisotropic magnetic particles 8 was obtained from a ratio of the cross-sectional area of the white in the first region 11.

The results are shown in Table 1.

<Inductance>

Both end portions in the transmission direction of the conducting line 6 were exposed from the insulating layer 7 and the magnetic layer 3 to form two exposed portions. They were connected to an impedance analyzer (manufactured by Agilent Technologies Japan, Ltd.: 4294A) to obtain the inductance. The inductance of the inductor 1 was evaluated based on the following criteria.

Excellent: the inductance was 110 H or more.

Good: the inductance was 90 H or more and below 110 H

Fair: the inductance was 60 H or more and below 90 H

Bad: the inductance was below 60 H

The results are shown in Table 1.

TABLE 1

| Magnetic Composition | | | Ex. 1/Ex. 2 First Magnetic Sheet Two-Layer Sheet in B-stage | | Ex. 3 First Magnetic Sheet Two-Layer Sheet in | Ex. 4 First Magnetic Sheet Two-Layer Sheet in | Ex. 5 First Magnetic Sheet Two-Layer Sheet in | Comparative Ex. 1 Second Magnetic Sheet/Third Magnetic Sheet Adhesive Sheet in B-stage and Magnetic Sheet in C-stage | | Comparative Ex. 2 Second Magnetic Sheet/Third Magnetic Sheet Pressure-Sensitive Adhesive Tape and Magnetic Sheet in C-stage | |
|---|---|---|---|---|---|---|---|---|---|---|---|
| | | | Inner-Side Sheet % by Volume | Outer-Side Sheet % by Volume | B-stage Single Sheet % by Volume | B-stage Single Sheet % by Volume | B-stage Single Sheet % by Volume | Inner-Side Sheet*1 % by Volume | Outer-Side Sheet*2 % by Volume | Inner-Side Sheet*3 % by Volume | Outer-Side Sheet*2 % by Volume |
| Magnetic Particles | Flat-Shaped Soft Magnetic Particles | Fe-Si-Al Alloy (Average Particle Size of 40 μ m) | 50 | 60 | 50 | 40 | 30 | 0 | 60 | 0 | 60 |
| Thermo-plastic Compo-nent | Carboxyl Group-Containing Acrylic Ester Copolymer | TEISANRESIN SG-70L Manufactured by Nagase ChemteX Corporation | 23.7 | 18.8 | 23.7 | 28.5 | 33.5 | 48.6 | 18.8 | | 18.8 |
| Thermo-setting Compo-nent (Epoxy Resin Compo-sition) | Cresol Novolak-Type Epoxy Resin (Main Agent) | KI-3000-4 Manufactured by Nippon Steel & Sumikin Chemical Co., Ltd. Epoxy Equivalent of 199 g/eq | 12.2 | 9.7 | 12.2 | 14.7 | 17.2 | 25.1 | 9.7 | | 9.7 |
| | Phenol Resin (Curing Agent) | MEH-7851SS Manufactured by MEIWA PLASTIC INDUSTRIES, LTD. | 12.4 | 9.8 | 12.4 | 15.0 | 17.6 | 25.5 | 9.8 | | 9.8 |
| | Imidazole Compound (Curing Accelerator) | 2PHZ-PW Manufactured by SHIKOKU CHEMICALS CORPO-RATION | 0.4 | 0.3 | 0.4 | 0.5 | 0.6 | 0.8 | 0.3 | | 0.3 |
| Filling Rate of Anisotropic Magnetic Particles in Peripheral Region (% by volume) | | | 57 | | 55 | 53 | 58 | 34 | | 18 | |
| Presence or Absence of Void | | | Absence | | Absence | Absence | Absence | Presence | | Presence | |
| Evaluation (Inductance) | | | Excellent | | Excellent | Good | Good | Fair | | Bad | |

*1Adhesive Sheet in B-stage
*2Magnetic Sheet in C-stage
*3Pressure-Sensitive Adhesive Sheet While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The inductor of the present invention is, for example, loaded on an electronic device and the like.

DESCRIPTION OF REFERENCE NUMERALS

1 Inductor
2 Wire
3 Magnetic layer
4 Peripheral region
6 Conducting line
7 Insulating layer
8 Anisotropic magnetic particles

9 Binder
11 First region
12 Second region
13 Third region
14 Fourth region
15 Fifth region
16 Sixth region
41 First release sheet
A1 First phantom circular arc
A2 Second phantom circular arc
C1 Central angle (third region)
C2 Central angle (fourth region)
C3 Center of first phantom circular arc
C4 Center of second phantom circular arc
E5 First end
E6 Second end
E7 Third end
E8 Fourth end
$\alpha$1 Angle of central angle (third region)
$\alpha$2 Angle of central angle (fourth region)

The invention claimed is:

1. An inductor comprising:

a wire and a magnetic layer covering the wire, wherein the wire includes a conducting line and an insulating layer covering the conducting line;

the magnetic layer contains a magnetic particle and a binder;

the magnetic particle includes an anisotropic magnetic particle;

in a peripheral region of the wire, a filling rate of the magnetic particle is 40% by volume or more;

the peripheral region is a region traveling outwardly from an outer surface of the wire by 1.5 times an average of the longest length and the shortest length from the center of gravity of the wire to the outer surface of the wire in a cross-sectional view;

the peripheral region includes:

a first region in which the anisotropic magnetic particle is orientated along an outer peripheral direction of the wire, and a second region in which another anisotropic magnetic particle is not orientated along the outer peripheral direction of the wire;

the first region includes two first regions disposed at spaced intervals to each other in the outer peripheral direction of the wire; and the two first regions are separated from each other by the second region in the outer peripheral direction of the wire.

2. The inductor according to claim 1, wherein the anisotropic magnetic particle is orientated in a portion adjacent to the wire in the magnetic layer.

3. The inductor according to claim 1, wherein:

the two first regions are a third region and a fourth region, and the total angle of an angle $\alpha$1 of the third region and an angle $\alpha$2 of the fourth region is above 180° and below 360°.

4. The inductor according to claim 1, wherein the binder contains a cured product of thermosetting component in a B-stage state.

* * * * *